US008468142B2

(12) United States Patent
Stergiou et al.

(10) Patent No.: US 8,468,142 B2
(45) Date of Patent: Jun. 18, 2013

(54) CACHING QUERY RESULTS WITH BINARY DECISION DIAGRAMS (BDDS)

(75) Inventors: Stergios Stergiou, Sunnyvale, CA (US); Jawahar Jain, Santa Clara, CA (US)

(73) Assignee: Fujitsu Limited, Kawasaki-shi (JP)

( * ) Notice: Subject to any disclaimer, the term of this patent is extended or adjusted under 35 U.S.C. 154(b) by 721 days.

(21) Appl. No.: 12/535,461

(22) Filed: Aug. 4, 2009

(65) Prior Publication Data
US 2010/0036835 A1    Feb. 11, 2010

Related U.S. Application Data

(60) Provisional application No. 61/086,672, filed on Aug. 6, 2008.

(51) Int. Cl.
*G06F 7/00*    (2006.01)
*G06F 17/30*    (2006.01)
(52) U.S. Cl.
USPC .......................................... 707/706; 707/741
(58) Field of Classification Search
USPC .................................. 707/706, 722, 741, 745
See application file for complete search history.

(56) References Cited

U.S. PATENT DOCUMENTS

| 5,737,242 | A | | 4/1998 | Madre |
| 5,915,249 | A | * | 6/1999 | Spencer ........................ 707/742 |
| 5,920,854 | A | * | 7/1999 | Kirsch et al. ......................... 1/1 |
| 6,363,377 | B1 | * | 3/2002 | Kravets et al. ........................ 1/1 |
| 6,658,458 | B1 | | 12/2003 | Gai |
| 7,136,899 | B1 | * | 11/2006 | Campailla ..................... 709/206 |
| 7,266,790 | B2 | * | 9/2007 | Pandey et al. .................. 716/107 |
| 8,332,385 | B2 | * | 12/2012 | Moor et al. .................... 707/713 |
| 2009/0287676 | A1 | * | 11/2009 | Dasdan ............................. 707/5 |

OTHER PUBLICATIONS

Lai et al, "Compressing Inverted Files in Scalable Information Systems by Binary Decision Diagram Encoding", 2001, ACM.*
Sias et al, "Accurate and Efficient Predicate Analysis with Binary Decision Diagrams", 2000.*
Akers, Sheldon B., "Binary Decision Diagrams," *IEEE Transactions on Computers*, C-27:6, 509-516, Jun. 1978.
Anderson, Henrik Reif, "An Introduction to Binary Decision Diagrams," Lecture notes for 49285 Advanced Algorithms E97, http://www.cs.unb.ca/profs/gdueck/courses/cs483S/bdd97, retrieved Oct. 29, 2009, Oct. 1997.
Manku, Gurmeet Singh, "Balanced binary trees for ID management and load balance in distributed hash tables," *Proceedings of the twenty-third annual ACM symposium on Principles of distributed computing*, 197-205, 2004.

(Continued)

*Primary Examiner* — Brannon W Smith
(74) *Attorney, Agent, or Firm* — Baker Botts L.L.P.

(57) ABSTRACT

Construct a plurality of first binary decision diagrams (BDDs), each representing a different one of a plurality of words. Construct a plurality of second BDDs, each representing a different one of a plurality of search queries, each of the search queries comprising one or more of the words. Construct a plurality of third BDDs, each representing a different one of a plurality of web pages. Construct a plurality of fourth BDDs, each representing a different one of a plurality of search results, each search result comprising one or more web pages. Construct a plurality of fifth BDDs each representing a different one of a plurality of search tuples, each of the search tuples comprising a different one of the search queries and a different one of the search results. Construct a sixth BDD representing the search queries and the search results.

65 Claims, 16 Drawing Sheets

OTHER PUBLICATIONS

Search Report for EP 09167292.3, Nov. 12, 2009.
Manku, G. "Balanced binary trees for ID management and load balance in distributed hash tables, " *Proceedings of the twenty-third annual ACM symposium on Principles of distributed computing.* 2004.
Akers, S. "Binary Decision Diagrams" *IEEE Transactions on Computers*, C-27(6), 509-516, Jun. 1978.
Andersen, H. R. "An Introduction to 1-24 Binary Decision Diagrams" Lecture Notes for 49285 Advabced Algorithms E97 Retrieved from the Internet: URL:http://www.cs.unb.ca/profs/gdueck/courses/cs483S/bdd97.pdf> on Oct. 29, 2009, Oct. 1998.
First Notification of Office Action and Translation of Office Action for Chinese Patent Application 2009102214199, Nov. 9, 2011.

\* cited by examiner

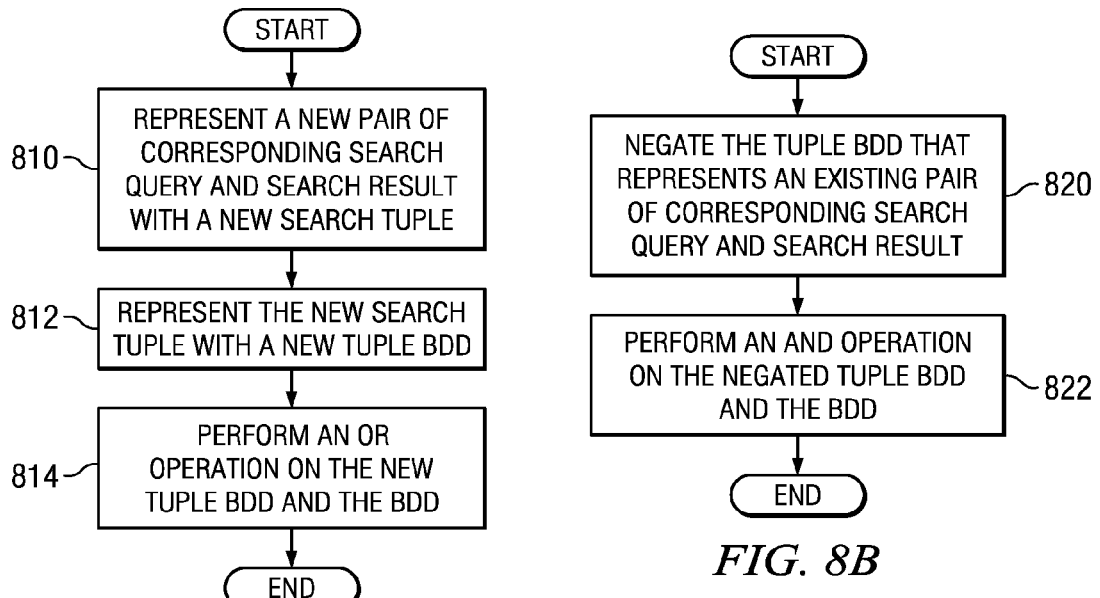
*FIG. 8A*
*FIG. 8B*
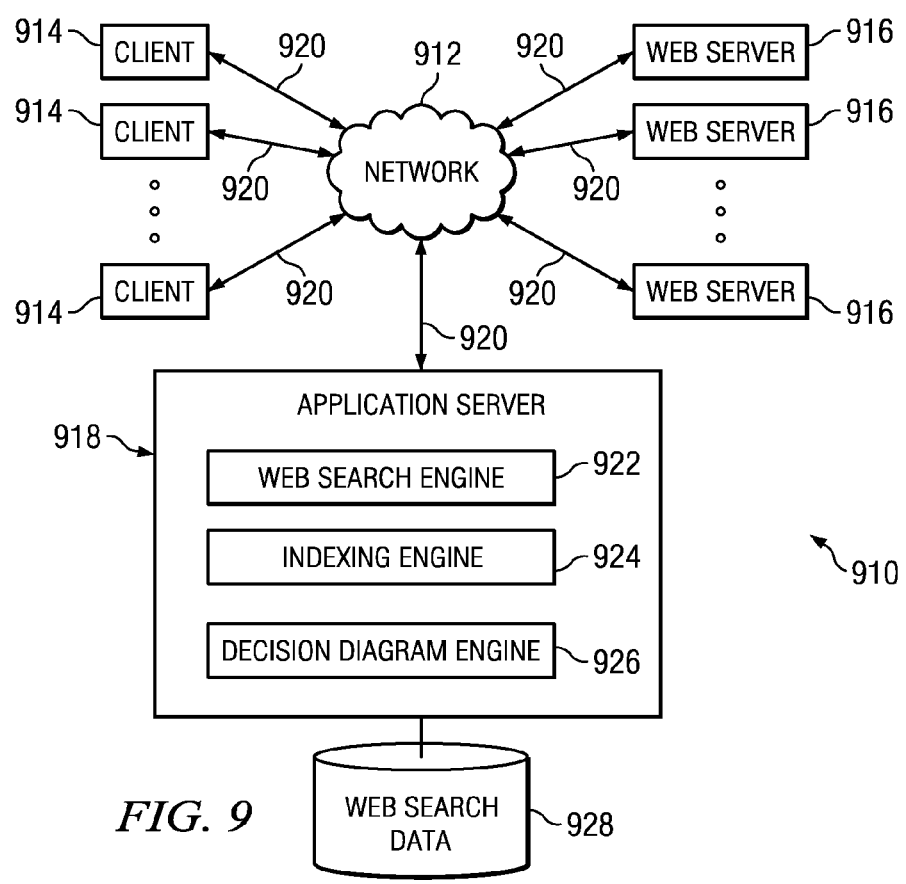
*FIG. 9*

CACHING QUERY RESULTS WITH BINARY DECISION DIAGRAMS (BDDS)

RELATED APPLICATION

This application claims benefit under 35 U.S.C. §119(e) of U.S. Provisional Patent Application No. 61/086,672, entitled CACHING QUERY RESULTS WITH BINARY DECISION DIAGRAMS (BDDs), filed 6 Aug. 2008, which is hereby incorporated by Reference.

TECHNICAL FIELD

This disclosure relates generally to caching Internet search results.

BACKGROUND

The Internet contains a vast amount of information. Various web pages at various websites contain much of this information. Typically, to locate specific information, a person searches for the information using a search engine. The person provides the search a search query describing the information sought and, using the search query, the search engine conducts a search on the Internet based on one or more search algorithms and returns a list of web pages that are likely to contain the information sought. The list of web pages is a search result of the search query.

A person may want to locate similar information at different times. Searching for specific information among all (or even a subset of) the web pages on the Internet is often time consuming, due to the large number of web pages available. One way to make such searching more efficient is to cache Internet search results and then use them later to provide search results for similar searches.

BRIEF DESCRIPTION OF THE DRAWINGS

FIG. 8A illustrates an example method for adding a new pair of corresponding search query and search result to a BDD representing a set of search queries and a set of corresponding search result according to particular embodiments.

FIG. 8B illustrates an example method for deleting an existing pair of corresponding search query and search result to from BDD representing a set of search queries and a set of corresponding search result according to particular embodiments.

FIG. 9 illustrates an example network environment in which a person may search information on the Internet according to particular embodiments.

DESCRIPTION OF EXAMPLE EMBODIMENTS

In particular embodiments, a set of search queries and a corresponding set of search results are cached using a Binary Decision Diagram (BDD). Each search query contains one or more words. Each search result contains one or more web pages obtained by conducting an Internet search using its corresponding search query.

A BDD is a data structure that may be used to represent a Boolean function. A BDD may be graphically represented as a rooted, directed, and acyclic graph having one or more decision nodes and two terminal nodes. Each decision node represents a different variable in the Boolean function, and is typically denoted as a circle in the graph. The two terminal nodes, a 0 terminal node and a 1 terminal node, are typically denoted as a square each in the graph. Each decision node has two edges, a 0 edge, typically denoted as a dash line or a dotted line in the graph, and a 1 edge, typically denoted as a solid line in the graph.

Each path in the graph may contain one or more decision nodes and eventually leads to either the 0 terminal node or the 1 terminal node. A path that leads to the 0 terminal node indicates that the Boolean function evaluates to FALSE for the values assigned to the variables represented by the decision nodes on the path, and a path that leads to the 1 terminal node indicates that the Boolean function evaluates to TRUE for the values assigned to the variables represented by the decision nodes on the path.

In particular embodiments, in a BDD that represents a set of search queries and a set of search results, a corresponding pair of search query and search result is represented by one or more paths. On each path, one or more decision nodes represent the search query and one or more different decision nodes represent each of the web pages contained in the search result. A path leading to the 1 terminal node indicates that the web page represented by some decision nodes on the path is included in the search result corresponding to the search query represented by other decision nodes on the same path.

Figure 1:
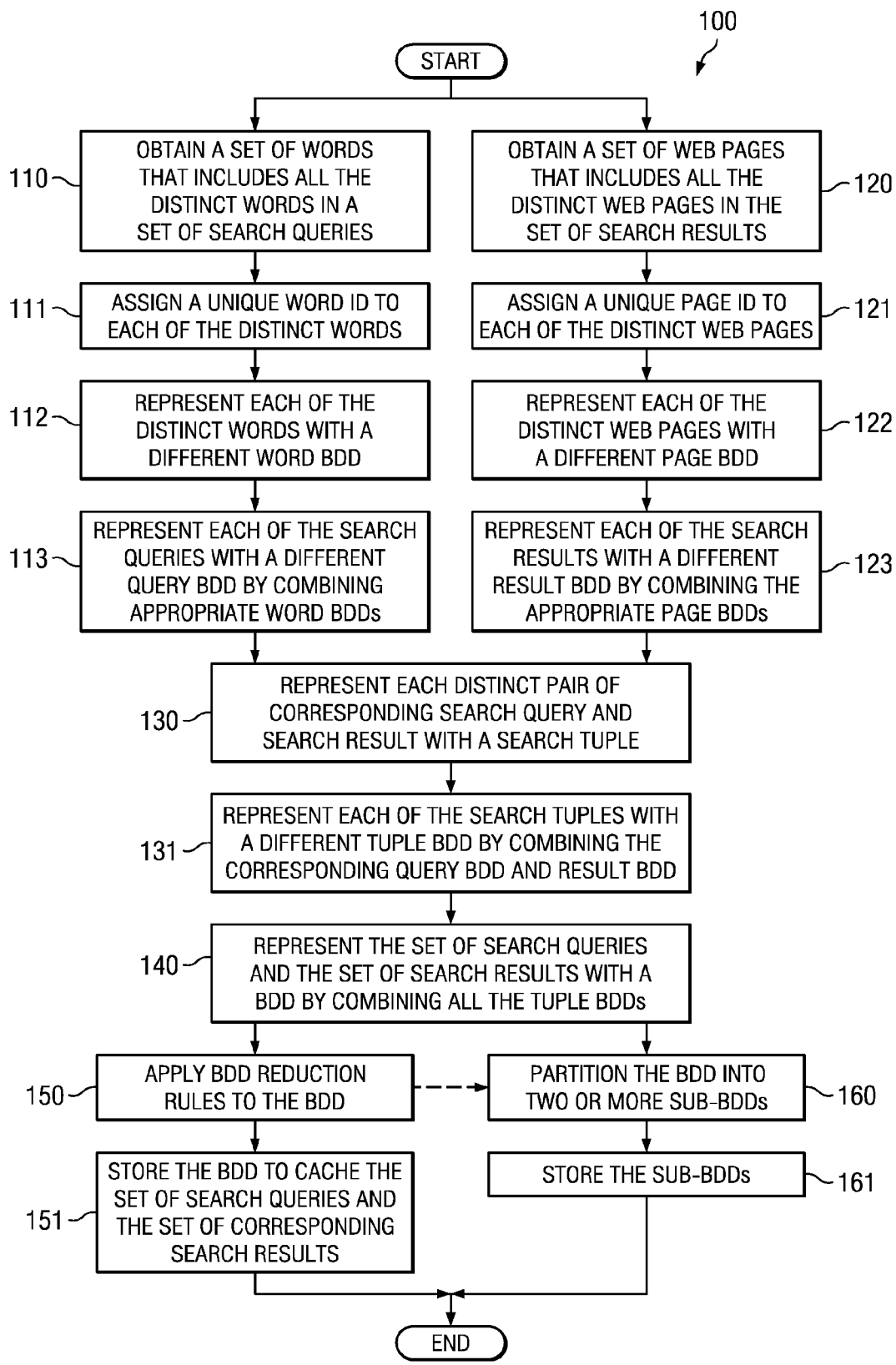
FIG. 1 illustrates an example method for caching Internet search results using a Binary Decision Diagram (BDD) according to particular embodiments.

FIG. 1 illustrates an example method for caching a set of search queries and a corresponding set of search results using a BDD. Various specific details of FIG. 1 are described using the following example illustrated in TABLE 1.

TABLE 1

SEARCH QUERIES AND SEARCH RESULTS

| Search Queries | Search Results (web pages) |
| --- | --- |
| cat food | A, B |
| dog food | A, C, D |
| car | E |

In the example illustrated in TABLE 1, the set of search queries contains three different search queries: "cat food," "dog food," and "car." The corresponding set of search results contains three different search results, each corresponding to a different search query, and each search result contains one or more web pages obtained by conducting a search on the Internet using the corresponding search query. Thus, for search query "cat food," the corresponding search result contains two web pages: web page A and web page B; for search query "dog food," the corresponding search result contains three web pages: web page A, web page C, and web page D; and for search query "car," the corresponding search result contains one web page: web page E.

For a set of search queries and a corresponding set of search results, the words appearing in some of the search queries may partially overlap, such that the same word may appear in multiple search queries. In the example illustrated in TABLE 1, the word "food" appears in both search queries "cat food" and "dog food."

Furthermore, for some search queries, their corresponding search results may partially overlap, such that the same web page may be included in multiple search results. In the example illustrated in TABLE 1, web page A is included in the search results corresponding to both search queries "cat food" and "dog food" as web page A may contain information on multiple types of pet food including both cat food and dog food.

In particular embodiments, a set of words that includes all the distinct words in the set of search queries is obtained (step 110). Thus, words that appear in multiple search queries are included in the set of words only once. A unique numerical word identifier (ID) is assigned to each of the distinct words (step 111). In particular embodiments, the word IDs are unique within the set of words, such that no two distinct words in the set of words have the same word ID.

In the example illustrated in TABLE 1, there are four distinct words in the set of three queries: "cat," "dog," "food," and "car." Thus, the set of words includes these four distinct words. Suppose the word ID assigned to word "cat" is 10; the word ID assigned to word "dog" is 11; the word ID assigned to word "food" is 12; and the word ID assigned to word "car" is 13. The following TABLE 2 contains the set of words and their respective word IDs in both decimal and binary formats.

TABLE 2

WORDS AND WORD IDs

| Words | Word IDs (decimal) | Word IDs (binary) |
|---|---|---|
| cat | 10 | 1010 |
| dog | 11 | 1011 |
| food | 12 | 1100 |
| car | 13 | 1101 |

Each of the distinct words is represented using a different BDD (step 112). For clarification reasons, a BDD that represents a single word is referred to as a "word BDD." An integer number may be written in binary format. For example, the number 10 in decimal format is 1010 in binary format; the number 11 in decimal format is 1011 in binary format; the number 12 in decimal format is 1100 in binary format; and the number 13 in decimal format is 1101 in binary format.

In particular embodiments, a word may be represented using a BDD based on its word ID. Each binary digit in the word ID is represented by a different variable that becomes a decision node in the BDD. The actual values of the binary digits indicate which path should lead to the 0 terminal node and which path should lead to the 1 terminal node in the BDD.

Figure 2A:
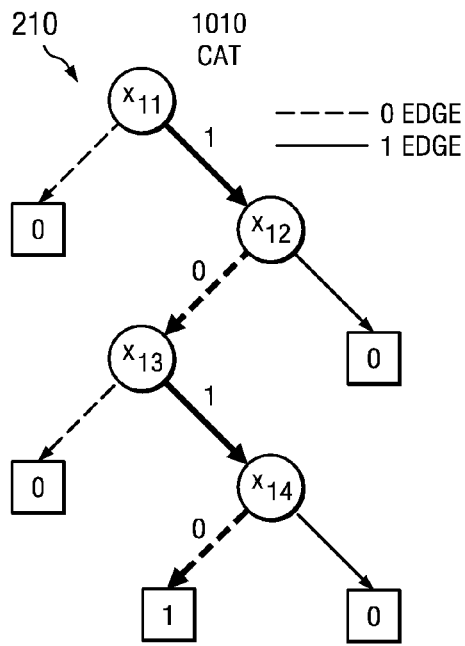
FIGS. 2A-2D illustrate four example word BDDs representing four words.

Consider word "cat" whose word ID is 1010 as an example. There are four binary digits in binary number 1010. Suppose the four binary digits, from left to right, are represented by the four variables $x_{11}$, $x_{12}$, $x_{13}$, and $x_{14}$ respectively. FIG. 2A illustrates a BDD 210 that represents word "cat" having word ID 1010. Word BDD 210 has four distinct decision nodes representing variables $x_{11}$, $x_{12}$, $x_{13}$, and $x_{14}$ respectively, which correspond to the four binary digits in word ID 1010. The sold edges represent value 1, and the dotted edges represent value 0. There is only one path in word BDD 210, the path denoting 1-0-1-0, which leads to the 1 terminal node. All the other paths lead to the 0 terminal node. Therefore, word BDD 210 represents word ID 1010, which in turn represents word "cat."

Figure 2C:
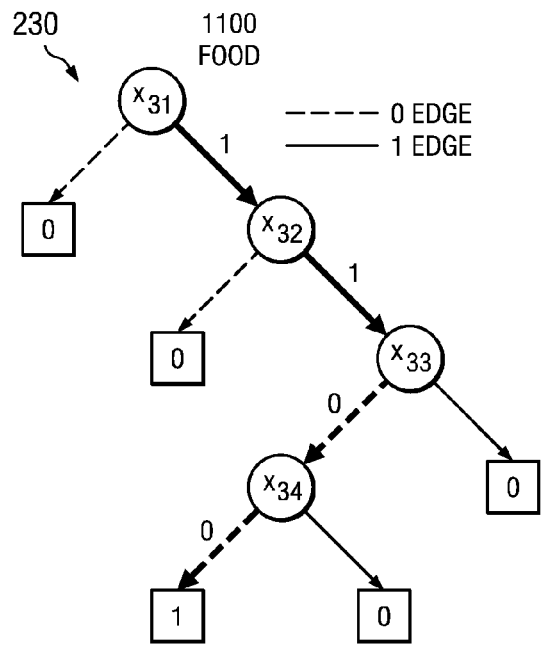
Figure 2B:
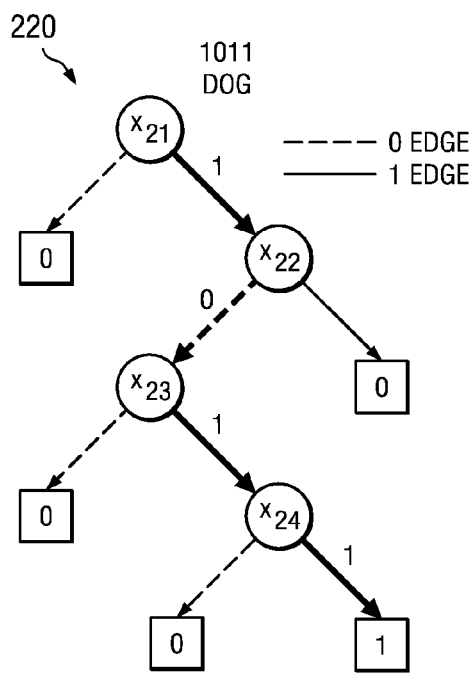

Similarly, FIG. 2B illustrates a BDD 220 that represent word "dog" whose word ID is 1011. From left to right, the four binary digits in word ID 1011 are represented by the four variables $x_{21}$, $x_{22}$, $x_{23}$, and $x_{24}$ respectively. There is only path in word BDD 220, the path denoting 1-0-1-1, which leads to the 1 terminal node. All the other paths lead to the 0 terminal node.

FIG. 2C illustrates a BDD 230 that represent word "food" whose word ID is 1100. From left to right, the four binary digits in word ID 1100 are represented by the four variables $x_{31}$, $x_{32}$, $x_{33}$, and $x_{34}$ respectively. There is only path in word BDD 230, the path denoting 1-1-0-0, which leads to the 1 terminal node. All the other paths lead to the 0 terminal node.

Figure 2D:
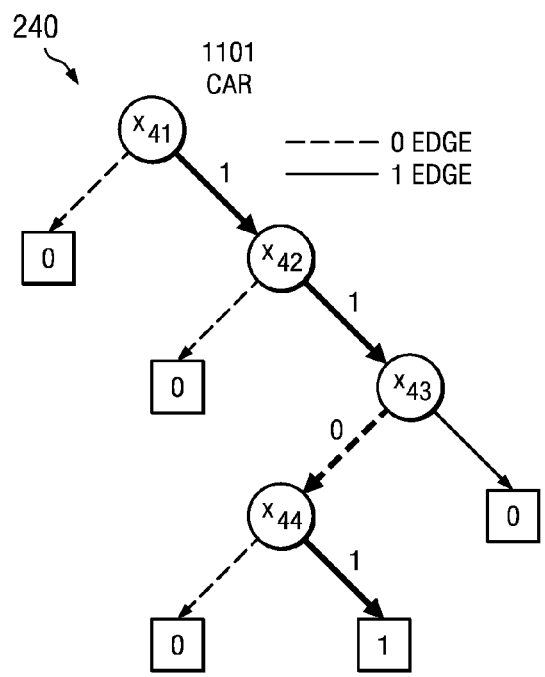

FIG. 2D illustrates a BDD 240 that represent word "car" whose word ID is 1101. From left to right, the four binary digits in word ID 1101 are represented by the four variables $x_{41}$, $x_{42}$, $x_{43}$, and $x_{44}$ respectively. There is only path in word BDD 240, the path denoting 1-1-0-1, which leads to the 1 terminal node. All the other paths lead to the 0 terminal node.

Note that although in FIGS. 2A-2D, unique variables, e.g., $x_{11}$-$x_{14}$, $x_{21}$-$x_{24}$, $x_{31}$-$x_{34}$, and $x_{41}$-$x_{44}$, are used to represent the four different word IDs illustrated in TABLE 2, it is not necessarily required. In fact, as will be shown below in FIG. 7, the same variable may be used to represent a particular binary digit in multiple word IDs. For example, the same four variables, e.g., $x_1$-$x_4$, may be used to represent the four binary digits of both word IDs of "cat" and "dog".

The number of different variables needed for a word BDD depends on the number of binary digits in the word ID represented by the word BDD. Since larger numbers have more digits, generally, the larger the word ID number, the more variables are needed for the word BDD representing the word ID, and vice versa. In particular embodiments, to make the number of variables in the word BDDs consistent, 0 digits may be added to the left of the smaller word IDs so that all word IDs have the same number of binary digits and thus require the same number of different variables.

Once the individual word BDDs have been constructed for the set of distinct words, each of the search queries is represented using a different BDD by combining appropriate word BDDs (step 113). For clarification reasons, a BDD that represents a single search query is referred to as a "query BDD." In addition, the sequence of binary digits that identifies a search query is referred to as a "query ID." In effect, a query ID identifying a search query is a combination of the word IDs identifying the words contained in the search query. In particular embodiments, a query BDD representing a search query is constructed by performing a logical AND operation on the individual word BDDs representing the words in the search query. In particular embodiments, the AND operation is performed on the word BDDs in the same order as the corresponding words appearing in the search query. In particular embodiments, to perform an AND operation on a first BDD and a second BDD, the 1 terminal node in the first BDD is replaced by the second BDD to obtain the result BDD.

Consider search query "cat food" that includes two words: "cat" and "food." The query BDD that represents search query "cat food" may be obtained by performing an AND operation on word BDD 210 that presents word "cat" and word BDD 230 that represents word "food." The 1 terminal node in word BDD 210 is replaced with word BDD 230. FIG.

3A illustrates a query BDD 310 that represents search query "cat food," which is the result of performing the AND operation on word BDD 210 and word BDD 230.

Figure 3A:
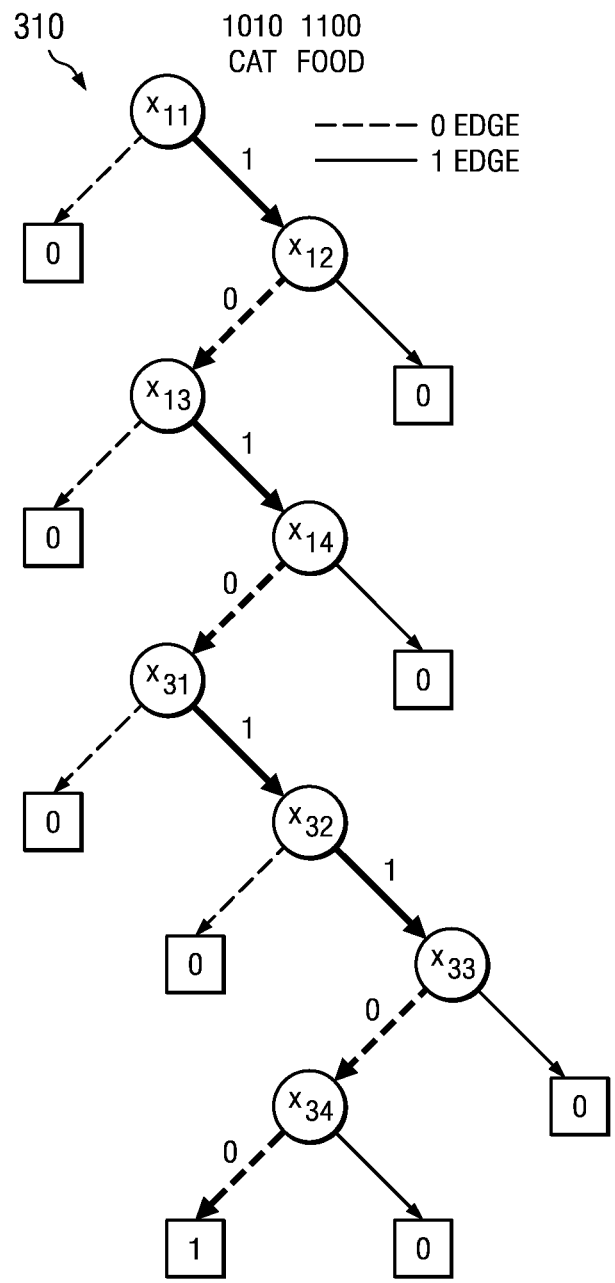
FIGS. 3A-3B illustrate two example query BDDs representing two search queries.
Figure 3B:
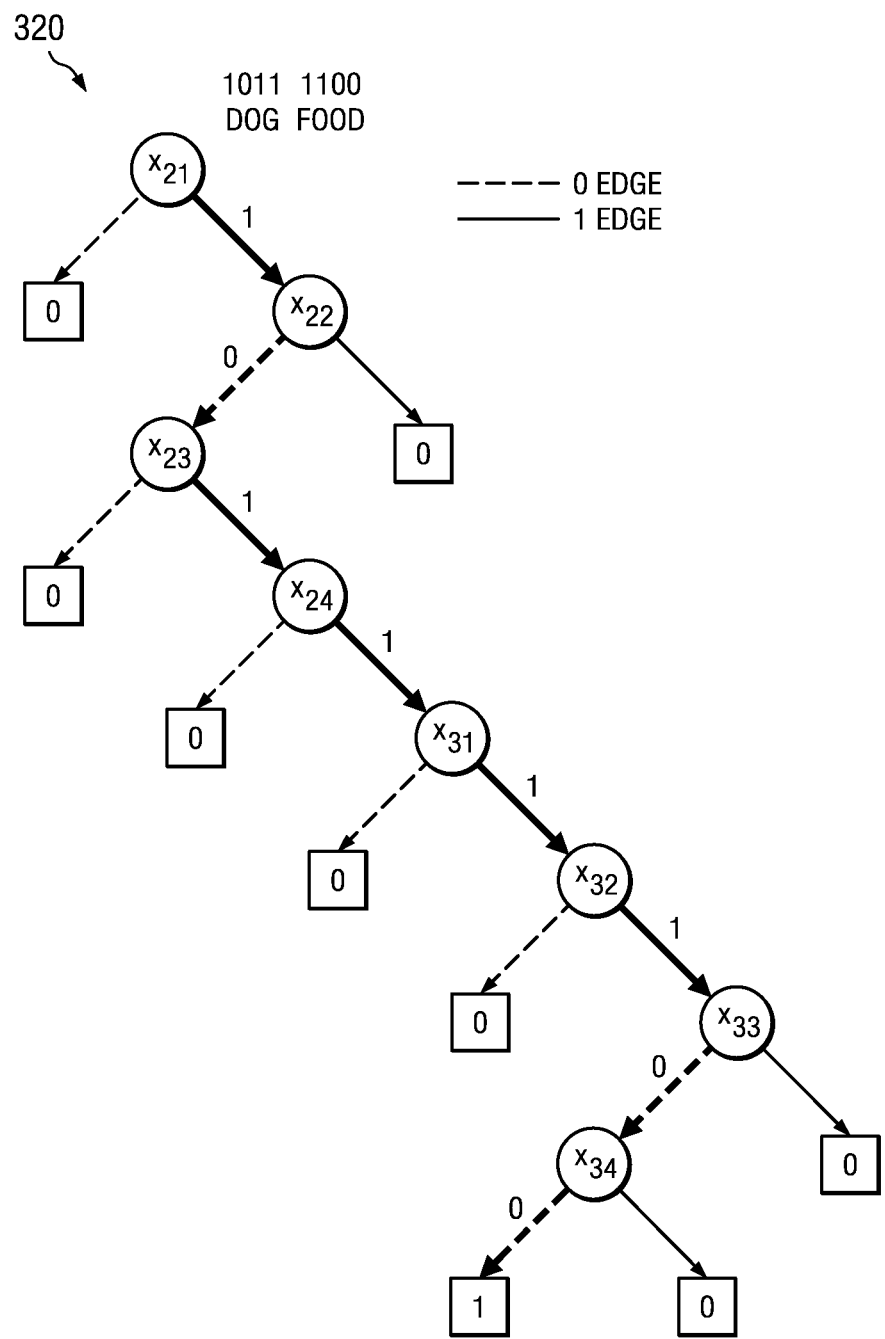
Figure 4A:
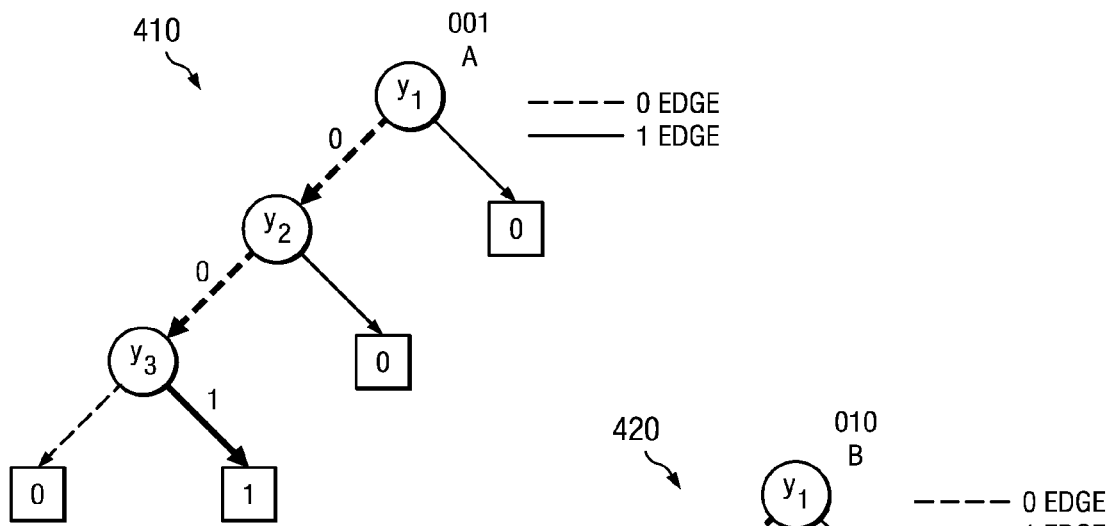
FIGS. 4A-4E illustrate five example page BDDs representing five web pages.
Figure 4B:
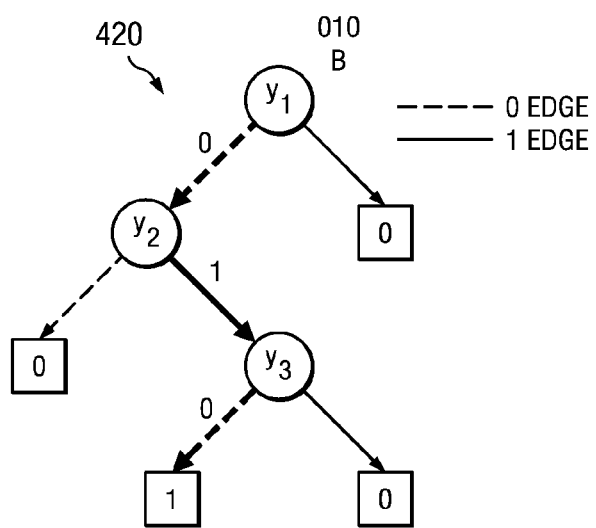
Figure 4C:
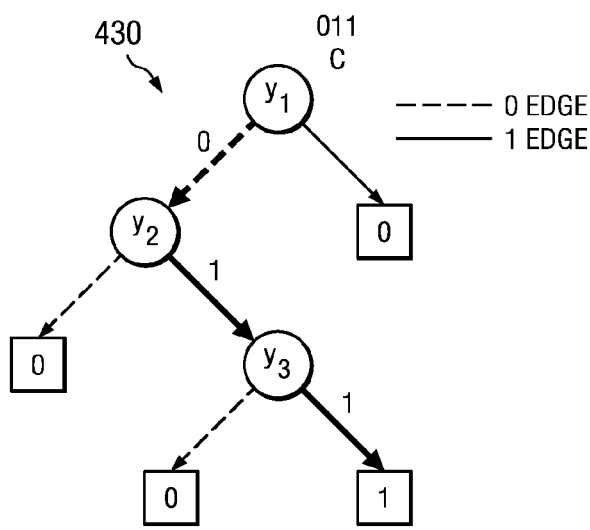
Figure 4D:
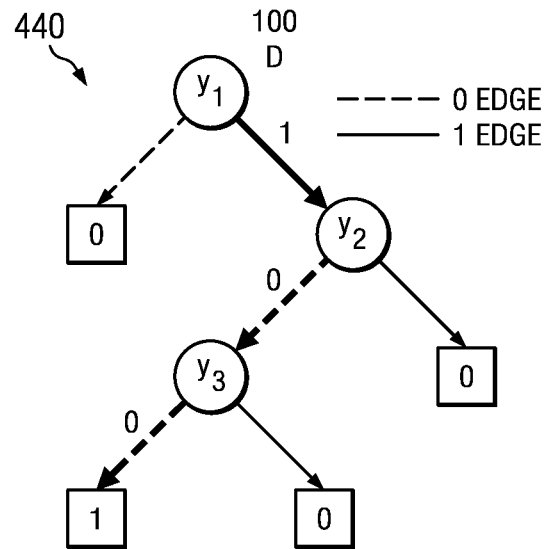
Figure 4E:
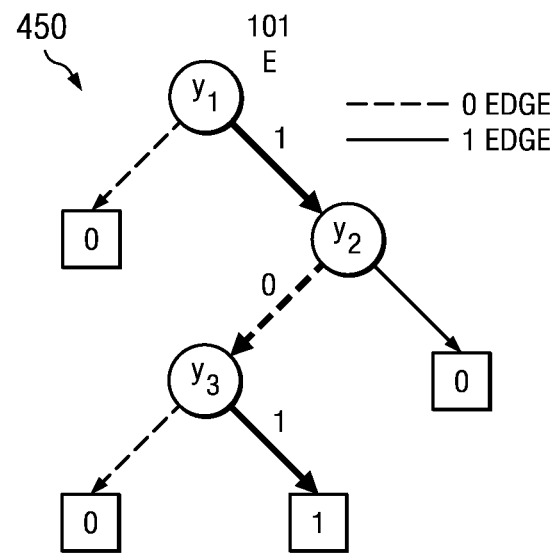

Similarly, FIG. 3B illustrates a query BDD 320 that represents search query "dog food," which is the result of performing an AND operation on word BDD 220, which represents word "dog," and word BDD 230, which represents word "food."

In particular embodiments, if a search query includes only one word, then the query BDD representing the search query is the same as the word BDD representing the word. For example, the query BDD representing search query "car" is the same as word BDD 240, which represents word "car."

Performing steps 110, 111, 112, and 113 results in a different query BDD being constructed for each of the search queries contained in the set of search queries. Steps 120, 121, 122, and 123, on the other hand, result in a BDD being constructed that represents a set of distinct web pages included in the set of search results corresponding to the set of search queries.

In particular embodiments, a set of web pages that includes all the distinct web pages in the set of search results is obtained (step 120). Web pages that are included in multiple search results are included in the set of web pages only once. A unique numerical page ID is assigned to each of the distinct web pages (step 121). In particular embodiments, the page IDs are unique within the set of web pages, such that no two distinct web pages in the set of web pages have the same page ID.

In particular embodiments, since the word IDs are unique only within the set of words (step 111) and the page IDs are unique only within the set of web pages (step 121), a word and a web page are permitted to have the same ID number. Consequently, a particular number may be used once as a word ID and once as a page ID, although it is not required.

In the example illustrated in TABLE 1, there are five distinct web pages in the set of three search results: A, B, C, D, and E. Thus, the set of web pages includes these five distinct web pages. Suppose the page ID assigned to web page A is 1; the page ID assigned to web page B is 2; the page ID assigned to web page C is 3; the page ID assigned to web page D is 4; and the page ID assigned to web page E is 5. The following TABLE 3 contains the set of web pages and their respective page IDs in both decimal and binary formats.

TABLE 3

WEB PAGES AND PAGE IDs

| Web Pages | Page IDs (decimal) | Page IDs (binary) |
|---|---|---|
| A | 1 | 001 |
| B | 2 | 010 |
| C | 3 | 011 |
| D | 4 | 100 |
| E | 5 | 101 |

As noted above, the number of binary digits required to represent an ID value depends on the actual ID value itself. Generally, larger ID values require more binary digits than smaller ID values. In TABLE 3, page ID 1 only requires one binary digit. Page IDs 2 and 3 each requires two binary digits. Page IDs 4 and 5 each requires three binary digits. In particular embodiments, to make the number of binary digits consistent in all the page IDs, one or more 0 digits are added to the left of some of the binary IDs so that all page IDs have the same number of binary digits. Thus, in TABLE 3, two 0 digits are added to the left of page ID 1, and one 0 digit is added to the left of each of page IDs 2 and 3. In particular embodiments, the largest page ID determines the total number of binary digits each page ID has.

Each of the distinct web pages is represented using a different BDD (step 122). For clarification reasons, a BDD that represents a single web page is referred to as a "page BDD." In particular embodiments, a web page may be represented using a BDD based on its page ID. A page BDD may be constructed for a web page based on its page ID using a process similar to constructing a word BDD for a word based on its word ID as described above. FIG. 4A-4E illustrate five page BDDs, 410, 420, 430, 440, and 450, representing web page A whose page ID is 001, web page B whose page ID is 010, web page C whose page ID is 011, web page D whose page ID is 100, and web page E whose page ID is 101 respectively.

In particular embodiments, in each of page BDDs 410, 420, 430, 440, and 450, the same three variables, $y_1$, $y_2$, and $y_3$, represent, from left to right, the three binary digits in each of corresponding page IDs 001, 010, 011, 100, and 101 respectively. Thus, the process of constructing page BDDs differ from the process of constructing word BDDs in this aspect. Specifically, the variables used to represent the binary digits of the page IDs in the corresponding page BDDs are unique within each page ID, not within the set of web pages. In fact, in particular embodiments, the same set of variables is reused in all of the page BDDs, as, for example, variables $y_1$, $y_2$, and $y_3$ are used in page BDDs 410, 420, 430, 440, and 450. Since all of the page IDs are made to have the same number of binary digits, e.g., by adding 0 digits when necessary, the same number of variables may be used to represent the binary digits in each of the page IDs.

In particular embodiments, if a variable is used in a word BDD, then it is not used in any page BDD. Conversely, if a variable is used in a page BDD, then it is not used in any word BDD.

Once the individual page BDDs have been constructed for the set of distinct web pages, each of the search results is represented using a different BDD by combining the appropriate page BDDs (step 123). For clarification reasons, a BDD that represents a search result is referred to as a "result BDD." In particular embodiments, a result BDD is constructed by performing a logical OR operation on the individual page BDDs representing the web pages included in the search result.

Figure 5A:
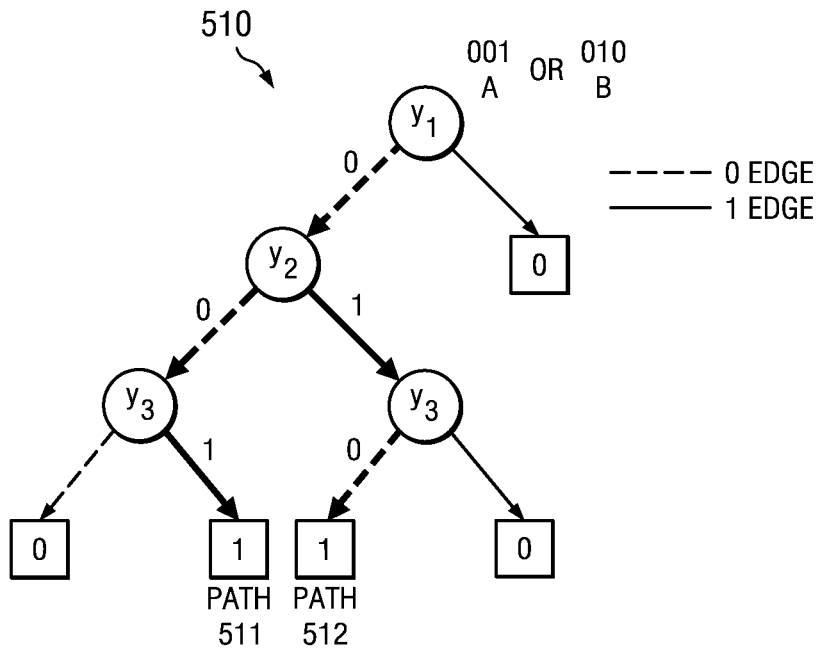
FIGS. 5A-5B illustrate two example result BDDs representing two search results.

Consider the search result for search query "cat food" that includes two web pages: A and B. The result BDD that represents this search result may be obtained by performing an OR operation on page BDD 410 that represents web page A and page BDD 420 that represents web page B. FIG. 5A illustrates a result BDD 510 that represents the search result for search query "cat food" that includes two web pages: A and B. In result BDD 510, there are two paths leading from decision node $y_1$ to the 1 terminal node: path 511 corresponds to page ID 001; and path 512 corresponds to page ID 010. At the same time, only these two page IDs identifying web pages A and B are included in result BDD 510, as all other paths lead to the 0 terminal node, indicating that the Boolean function represented by result BDD 500 evaluates to FALSE for all other values assigned to the three variables, $y_1$, $y_2$, and $y_3$.

Figure 5B:
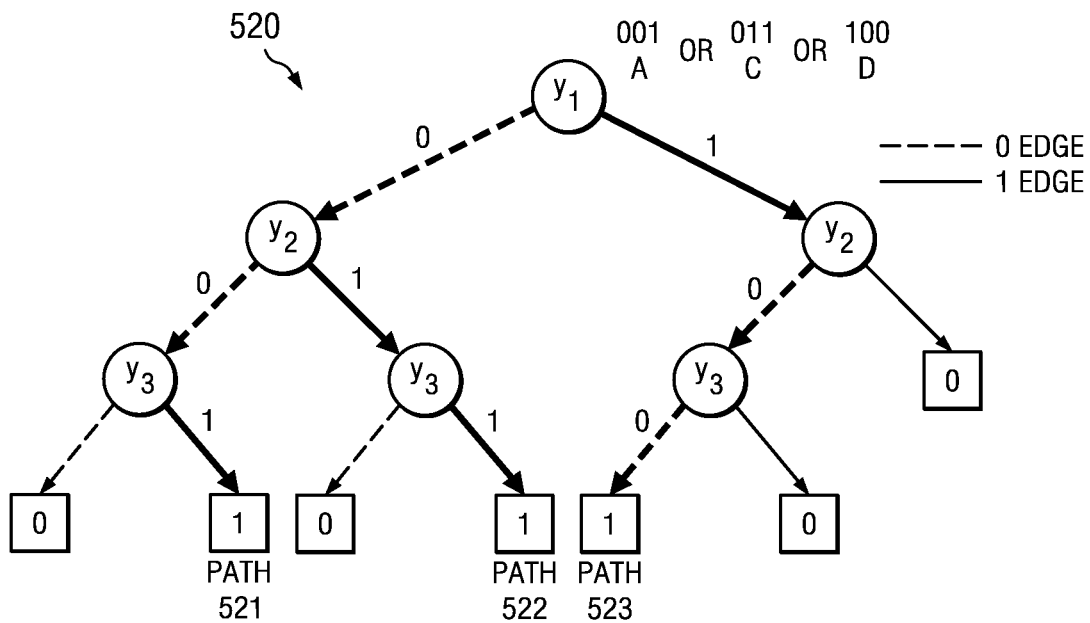

FIG. 5B illustrates a result BDD 520 that represents the search result for search query "dog food" that includes three web pages: A, C, and D. In result BDD 520, there are three paths leading from decision node $y_1$ to the 1 terminal node: path 521 corresponds to page ID 001; path 522 corresponds to page ID 011; and path 523 corresponds to page ID 100. At the same time, only these three page IDs identifying web pages A, C, and D are included in result BDD 520, as all other paths lead to the 0 terminal node In particular embodiments, if a search result includes only one web page, then the result BDD representing the search result is the same as the page BDD representing the web page. For example, the search result for search query "car" includes only one web page: E. Thus, the result BDD representing the search result for search query "car" is the same as page BDD 450, which represents web page E.

As described above, a search result is obtained for a search query by conducting a search on the Internet for the search query. The search query may contain one or more words, and the search result may contain one or more web pages. Consequently, a set of search queries contains multiple search queries, and a corresponding set of search results contains search results obtained for the search queries.

In particular embodiments, each distinct pair of corresponding search query and search result is represented as a search tuple (step 130). Previously, in step 111, each word that may appear in a search query has been assigned a word ID, and in step 121, each web page that may be included in a search result has been assigned a page ID. Thus, in particular embodiments, a search tuple representing a pair of corresponding search query and search result may contain the word IDs of the words appearing in the search query, followed by the page IDs of the web page included in the search result. In particular embodiments, the word IDs appear in the search tuple in the same order as their corresponding words appear in the search query. The following TABLE 4 contains the three pairs of corresponding search query and search result illustrated in TABLE 1 and their search tuples.

TABLE 4

SEARCH QUERIES, SEARCH RESULTS, AND SEARCH TUPLES

| Search Queries | Search Results (web pages) | Search Tuples (word IDs; page IDs) |
|---|---|---|
| cat food | A, B | <10, 12; 1, 2> |
| dog food | A, C, D | <11, 12; 1, 3, 4> |
| car | E | <13; 5> |

In particular embodiments, each of the search tuples, which corresponds to a distinct pair of corresponding search query and search result, is represented using a different BDD by combining the corresponding query BDD and result BDD (step 131). For clarification reasons, a BDD that represents a search tuple is referred to as a "tuple BDD." Previously in step 113, a different query BDD has been constructed for each of the search queries in the set of search queries, and in step 123, a different result BDD has been constructed for each of the search results in the corresponding set of search results. In particular embodiments, a tuple BDD representing a search tuple, which includes a corresponding pair of search query and search result, is constructed by performing a logical AND operation on the query BDD representing the search query and the result BDD representing the search result.

Figure 6A:
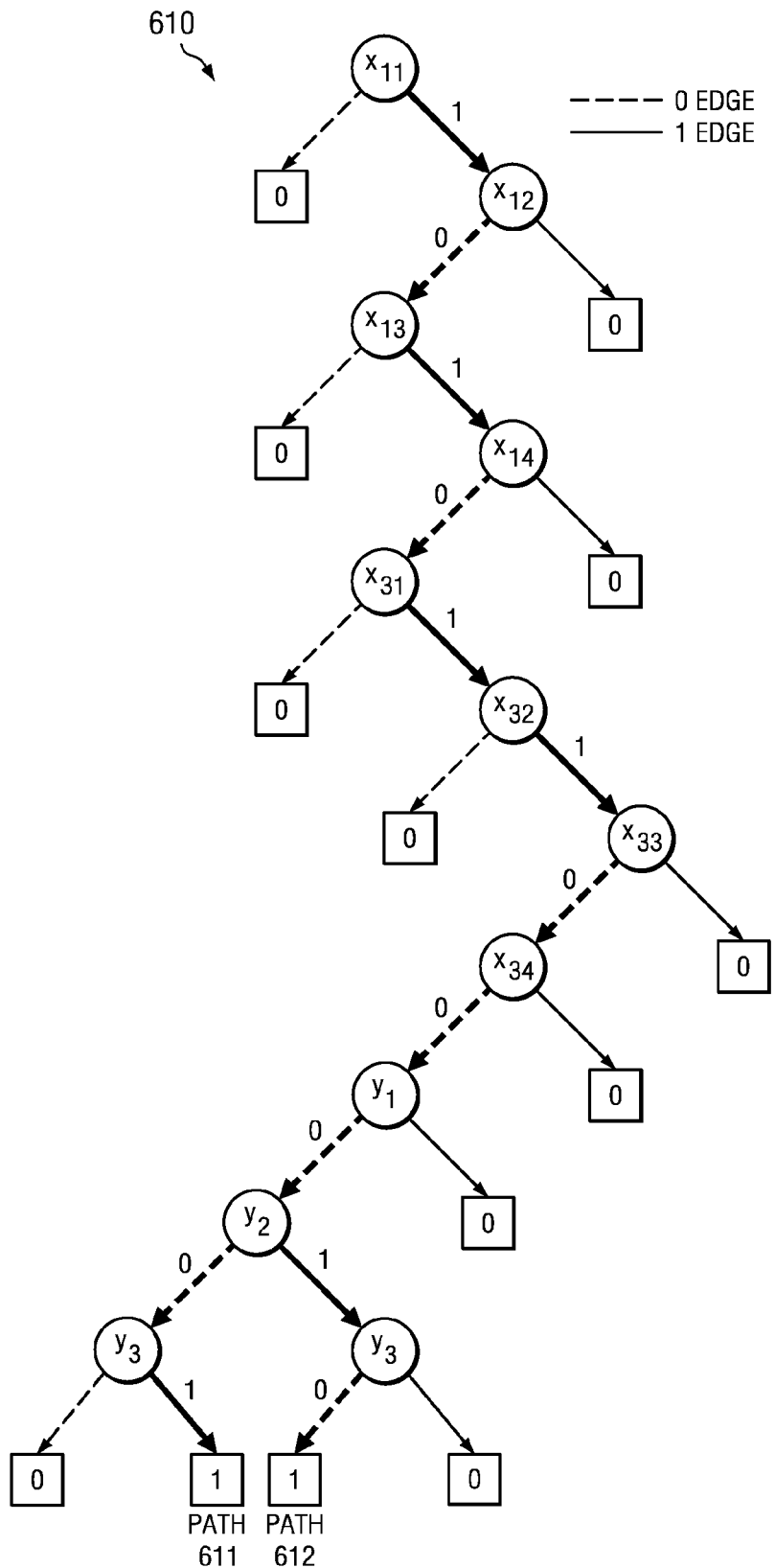
FIG. 6A-6C illustrate three example tuple BDDs representing three search tuples.

In the example illustrated in TABLE 1, a tuple BDD 610 representing search tuple <10, 12; 1, 2>, illustrated in FIG. 6A, is obtained by performing an AND operation on query BDD 310, which represents search query "cat food," and result BDD 510, which represents the search result that includes web pages A and B. As described above, to perform the AND operation on query BDD 310 and result BDD 510, the 1 terminal node in query BDD 310 is replaced with result BDD 510 to obtain tuple BDD 610. In tuple BDD 610, there are two paths, 611 and 612, that lead from decision node $x_{11}$ to the 1 terminal node.

Consider path 611 as an example. For the eleven decision nodes on path 611, $x_{11}, x_{12}, x_{13}, x_{14}, x_{31}, x_{32}, x_{33}, x_{34}, y_1, y_2$, and $y_3$, their binary values for path 611 are 1-0-1-0-1-1-0-0-0-0-1. The first four binary digits, 1-0-1-0, is the word ID for word "cat;" and the middle four binary digits, 1-1-0-0, is the word ID for word "food." Thus, the first eight binary digits together, 1-0-1-0-1-1-0-0, represent search query "cat food." The last three binary digits, 0-0-1, is the page ID for web page A. The fact that path 611 leads to the 1 terminal node indicates that web page A, as identified by the values of some of the decision nodes, e.g., decision nodes $y_1, y_2$, and $y_3$, on path 611, is included in the search result obtained for search query "cat food," as identified by the values of some other decision nodes, e.g., $x_{11}, x_{12}, x_{13}, x_{14}, x_{31}, x_{32}, x_{33}$, and $x_{34}$, on path 611.

For path 612, the binary values of the eleven decision nodes on path 612 are 1-0-1-0-1-1-0-0-0-1-0. The first eight binary digits together, 1-0-1-0-1-1-0-0, represent search query "cat food," which is same as on path 611, since tuple BDD 610 represents the search tuple that includes search query "cat food." The last three binary digits, 0-1-0, is the page ID for web page B. Path 612 leads to the 1 terminal node as web page B is included in the search result obtained for search query "cat food."

In particular embodiments, in a tuple BDD, a path that leads to the 1 terminal node indicates that a web page identified by the values of some of the decision nodes on the path is included in the search result corresponding to a search query identified by the values of some other decision nodes on the same path.

Figure 6B:
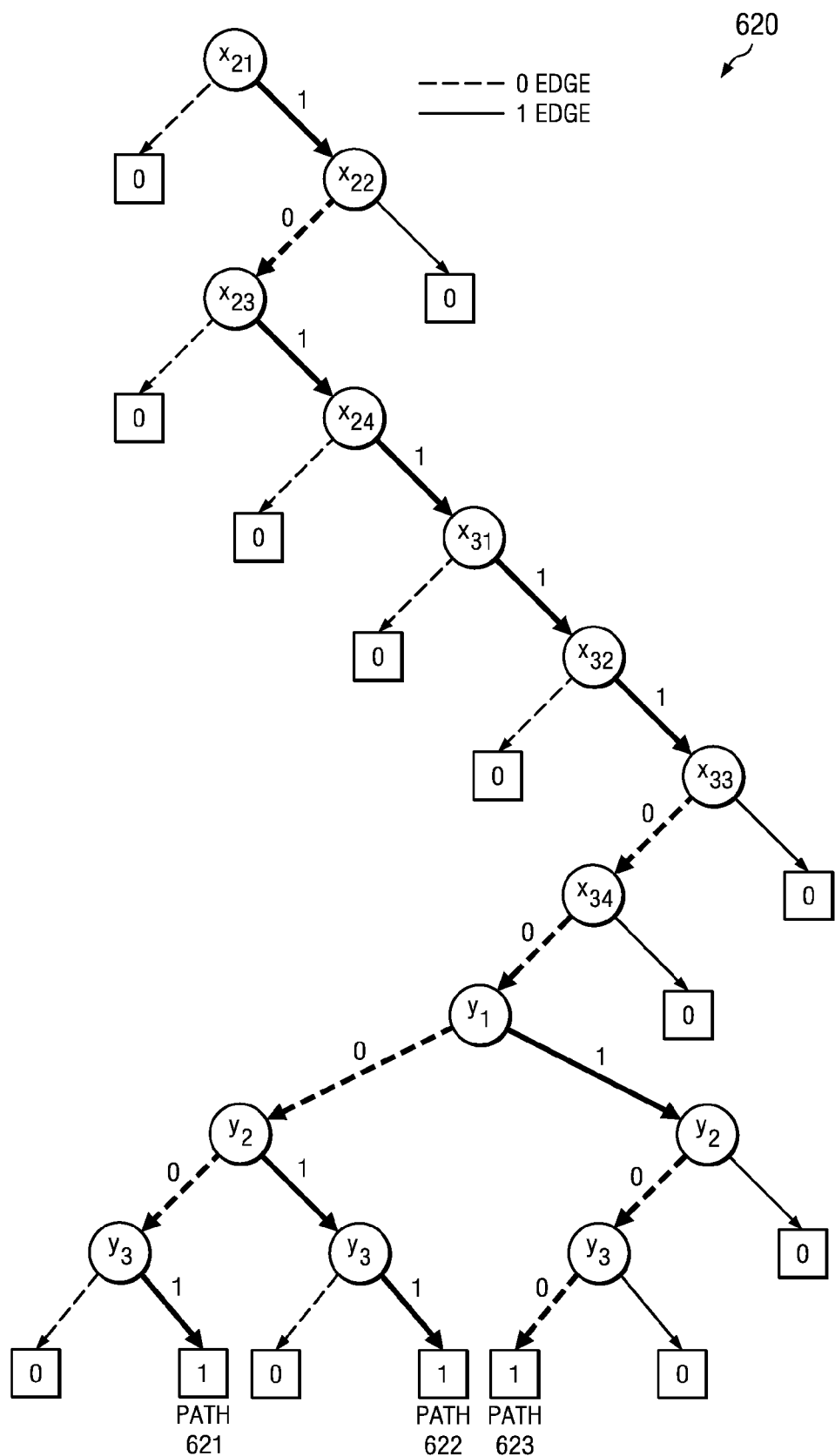

Similarly, a tuple BDD 620 representing search tuple <11, 12; 1, 3, 4>, illustrated in FIG. 6B, is obtained by performing an AND operation on query BDD 320, which represents search query "dog food," and result BDD 520, which represents the search result that includes web pages A, C, and D. In tuple BDD 620, there are three paths, paths 621, 622, and 623, that lead from decision node $x_{21}$ to the 1 terminal node, as there are three web pages, A, C, and D, that are included in the search result for search query "dog food."

Figure 6C:
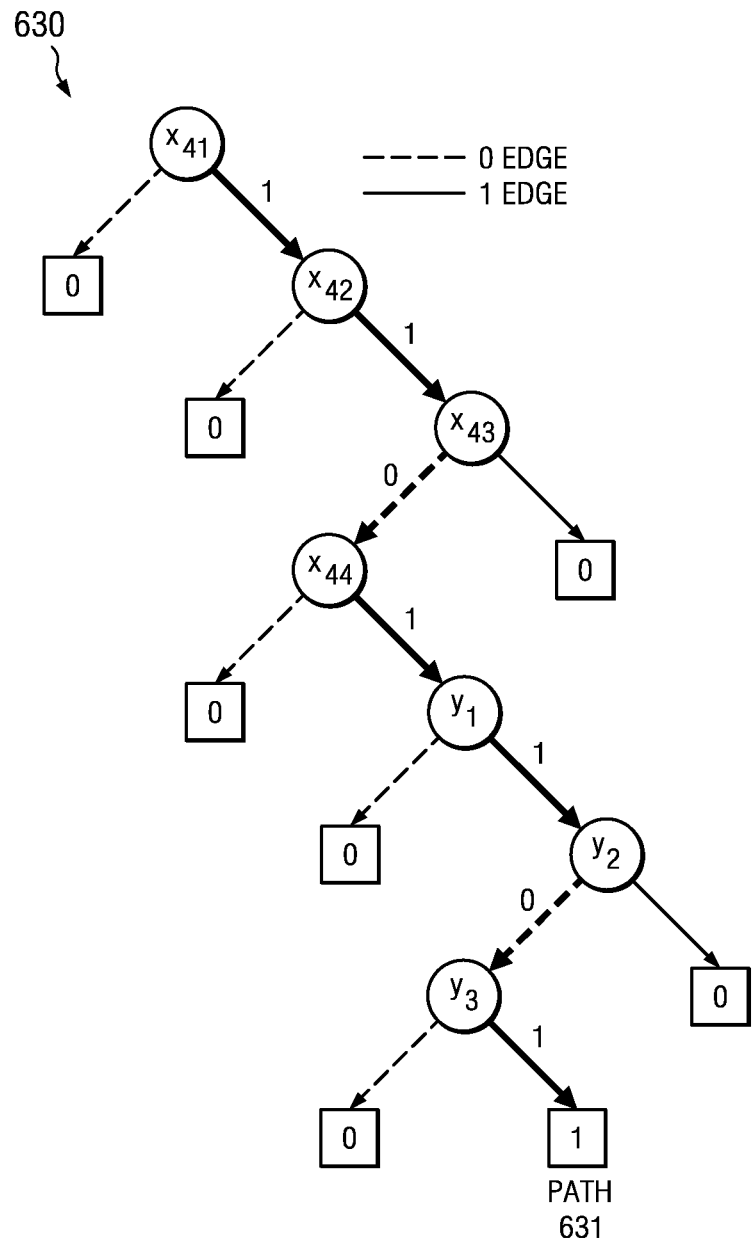

A tuple BDD 630 representing search tuple <13; 5>, illustrated in FIG. 6C, is obtained by performing an AND operation on word BDD 240, which represents word "car" and is the same as the search BDD for search query "car," and page BDD 450, which represents web page E and is the same as the result BDD representing the search result obtained for search query "car." In tuple BDD 630, there is one path, path 631, that leads from decision node $x_{41}$ to the 1 terminal node. Path 631 only has seven decision nodes because search query "car" only contains one word.

In particular embodiments, once the individual tuple BDDs have been constructed, the entire set of search queries and the entire set of corresponding search results is represented using a single BDD by combining all of the individual tuple BDDs (step 140). In particular embodiments, the BDD is constructed by performing a logical OR operation on all of the individual tuple BDDs. In the BDD, any path that leads to the 1 terminal node indicates that a web page identified by the values of some of the decision nodes on the path is included in the search result corresponding to a search query identified by the values of some other decision nodes on the same path.

The example illustrated in TABLE 1 only has four distinct words and five distinct web pages, and yet, the various types of BDDs quickly grow in size. In practice, when caching corresponding sets of search queries and search results that may include hundreds, even thousands of different words and web pages, the final BDD may become very large in size. BDDs tend to suffer from space blowup when sharing is minimal.

In particular embodiments, various BDD reduction rules may be applied to the BDD to reduce the size of the BDD (step 150). Existing BDD reductions rules include merging any isomorphic sub-graphs, eliminating any decision node whose two children are isomorphic, etc. In particular embodiments, various BDD reductions rules may also be applied to various intermediary BDDs, such as query BDDs, result BDDs, or tuple BDDs. In particular embodiments, suitable BDD reductions rules are applied to the various BDDs whenever necessary to maximally reduce the sizes of the BDDs.

The BDD may then be stored as a way of caching the set of search queries and the set of corresponding search results (step 151).

In some cases, a BDD may be partitioned according to existing BDD partition rules such that the sum of the sizes of the sub-BDDs is less than the size of the original BDD. In particular embodiments, the BDD may be partitioned into two or more sub-BDDs (step 160) and the sub-BDDs are stored instead of the single BDD (step 161). In particular embodiments, the partition of the BDD may be based on the categories of the search queries. In the example illustrated in TABLE 1, two search queries, "cat food" and "dog food," relate to pet good, and one search query, "car," relate to automobile. Thus, one way to partition the BDD representing these three search tuples is to have two sub-BDDs, one for pet food related search queries, the other one for automobile related search queries.

In practice, the search queries represented by a BDD may be divided into any number of categories based on any suitable criteria. Examples of search query categories may include, but not limited to, "sports," "politics," "travel," "health," "weather," "finance," etc. Smaller sub-BDDs may lead to more efficient lookup time when information is access and retrieved from each BDD.

FIG. 1 illustrates step by step the construction of a BDD that may be used to represent, and thus cache, a set of search queries and a corresponding set of search results obtained by conducting Internet search on each of the search queries. In practice, depending on the set of search queries and the corresponding set of search results as well as the BDD to be constructed, some of the specific steps may be bypassed. In the final BDD, a path that leads to the 1 terminal node indicates that a web page identified by the values of some of the decision nodes on the path is included in the search result corresponding to a search query identified by the values of some other decision nodes on the same path.

A BDD is a data structure that has a specific format. It represents a Boolean function, $f$, of one or more variables, and each variable may have a value of 0 or a value of 1. When represented graphically, each variable of the function $f$ may be represented as a decision node, and each decision node has two edges: a 0 edge and a 1 edge. When traversing a path in the BDD, following the 0 edge from a decision node indicates that the variable represented by the decision node has a value of 0, and following the 1 edge from a decision node indicates that the variable represented by the decision node has a value of 1. A path that leads to the 0 terminal node indicates that for the values assigned to the variables represented by the decision nodes on the path, the Boolean function $f$ evaluates to 0. A path that leads to the 1 terminal node indicates that for the values assigned to the variables represented by the decision nodes on the path, the Boolean function $f$ evaluates to 1.

In particular embodiments, the data in a set of search queries and a corresponding set of search results to be represented by a BDD may need to be modified so that they are suitable for the format of the BDD data structure. In particular embodiments, each search query in the set of search queries should have the same number of words. If a particular search query has less than the required number of words, then 0 digits are added to represent the one or more missing words. Let k be the number of words in each search query, where k=1, 2, . . . n . In particular embodiments, the value of k equals the number of words in a search query from the set of search queries that has the most number of words.

In the example illustrated in TABLE 1, k is 2. Both search queries "cat food" and "dog food" have two words. However, search query "car" only has one word. Thus, a 0 may be added to search query "car" to make up for the second word. As illustrated in TABLE 2, each word ID in binary format has four binary digits. Thus, to represent each search query in TABLE 1 in binary format takes eight binary digits. For clarification purposes, the combined word IDs that identifies a search query is referred to as a "query ID." In addition, as illustrated in TABLE 3, each page ID in binary format has three binary digits. Therefore, to represent a corresponding pair of a search query and a web page in binary format takes eleven binary digits. The following TABLE 5 illustrates corresponding pairs of search query and web page and their binary representations.

TABLE 5

SEARCH QUERIES, WEB PAGES, AND BINARY REPRESENTATIONS

| Search Queries | Web Pages | Binary Representations |
| --- | --- | --- |
| cat food | A | 1-0-1-0-1-1-0-0-0-0-1 |
| cat food | B | 1-0-1-0-1-1-0-0-0-1-0 |
| dog food | A | 1-0-1-1-1-1-0-0-0-0-1 |
| dog food | C | 1-0-1-1-1-1-0-0-0-1-1 |
| dog food | D | 1-0-1-1-1-1-0-0-1-0-0 |
| car | E | 0-0-0-0-1-1-0-1-1-0-1 |

Figure 7A:
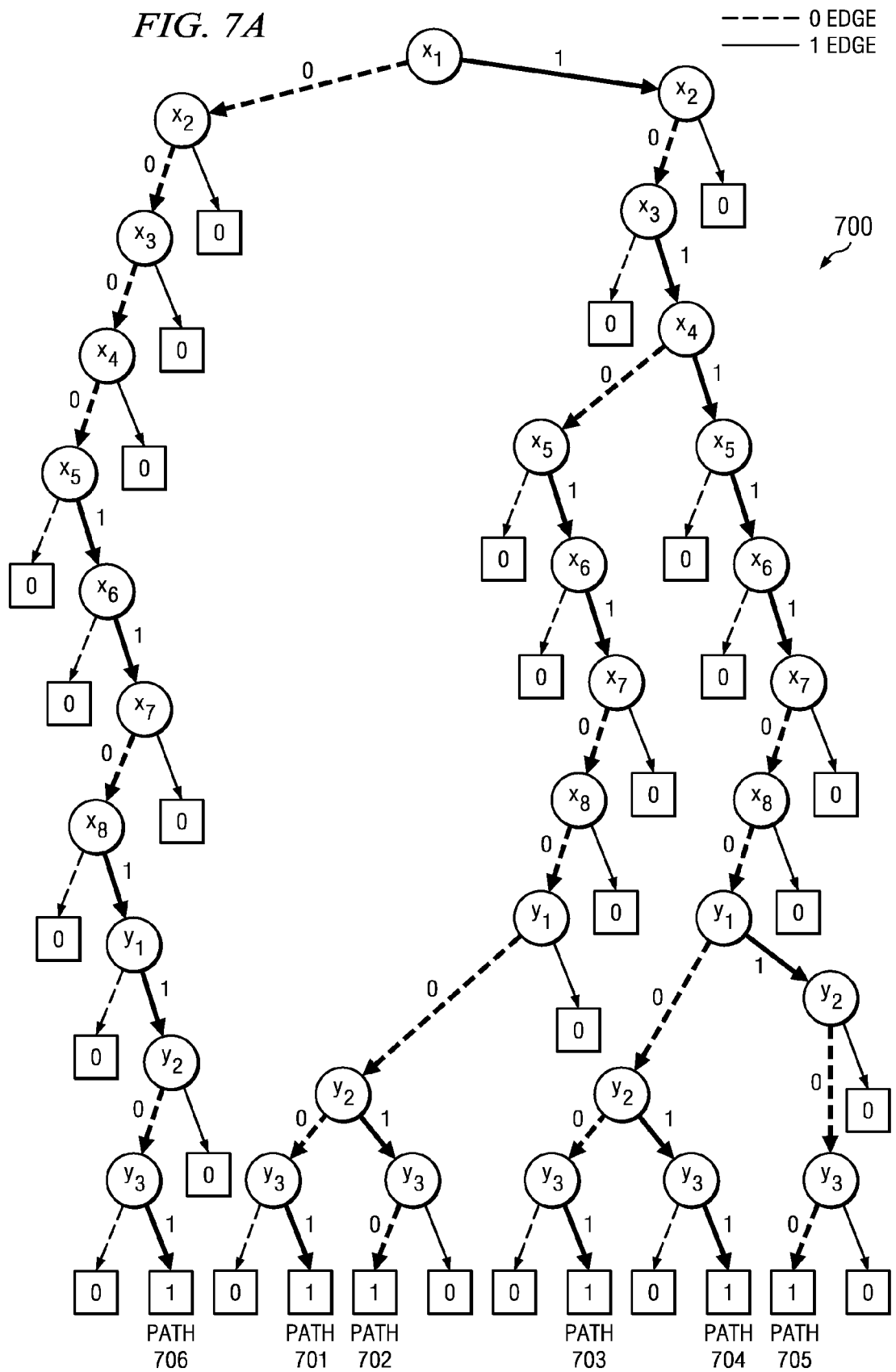
FIG. 7A illustrates a BDD representing a set of search queries and a corresponding set of search results.

Each binary digit is represented by a variable that becomes a decision node in the BDD. Let variables $x_1, x_2, x_3, x_4, x_5, x_6, x_7$, and $x_8$ represent the first eight binary digits corresponding to the search query and let variables $y_1, y_2$, and $y_3$ represent the last three binary corresponding to the web page. FIG. 7A illustrates a BDD 700 that represents the set of search queries and the corresponding set of search results as illustrated in TABLE 1. In BDD 700, there are six paths, 701, 702, 703, 704, 705, and 706, that lead to the 1 terminal node, each path representing a different corresponding pair of search query and web page illustrated in TABLE 5. All the other paths lead to the 0 terminal node. Consequently, path 701 indicates that web page A is included in the search result for search query "cat food;" path 702 indicates that web page B is included in the search result for search query "cat food;" path 703 indicates that web page A is included in the search result for search query "dog food;" path 704 indicates that web page C is included in the search result for search query "dog food;" path 705 indicates that web page D is included in the search result for search query "dog food;" and path 706 indicates that web page E is included in the search result for search query "car."

Figure 7B:
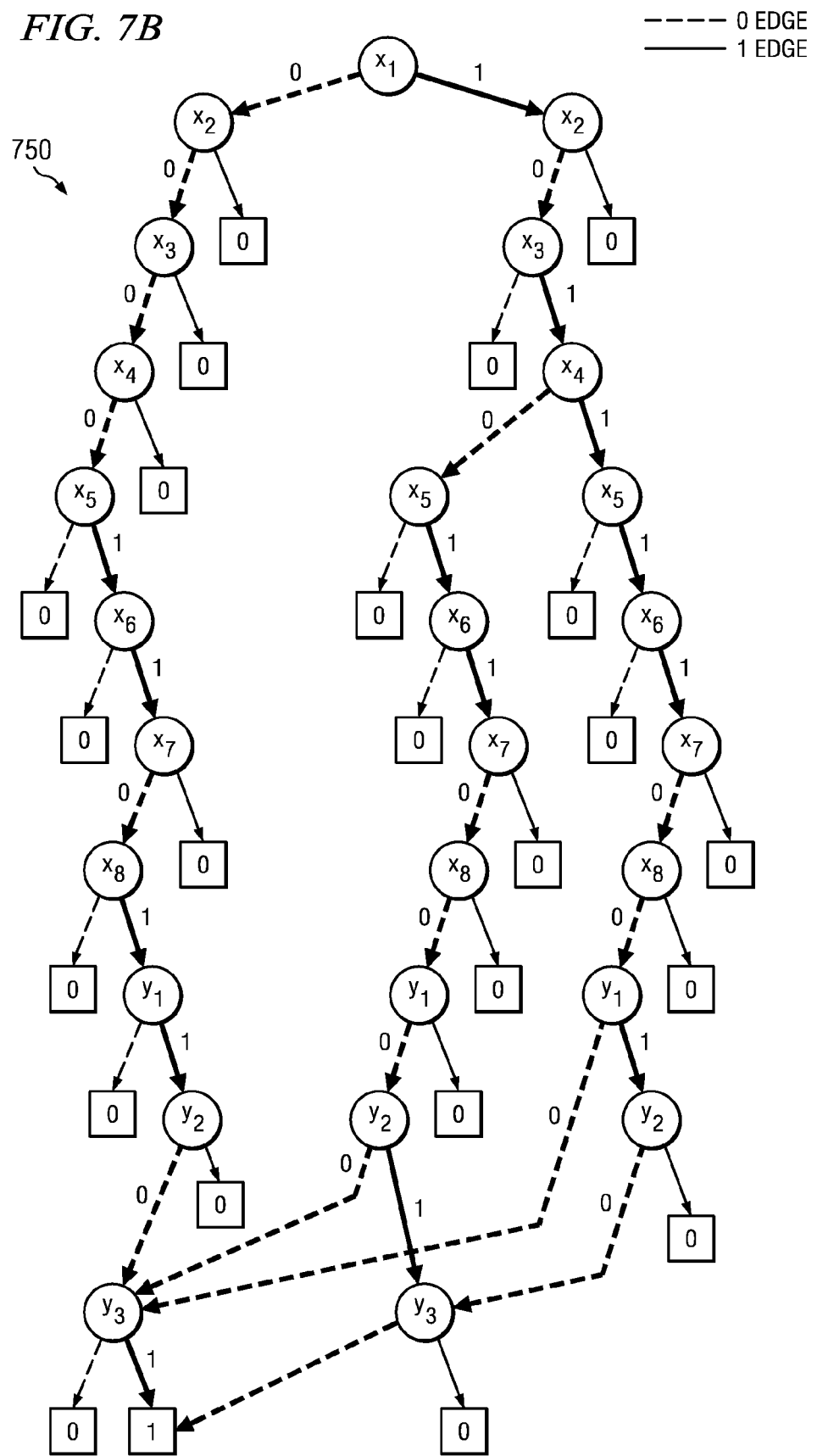
FIG. 7B illustrates a BDD representing the result of applying reduction rules to the BDD illustrated in FIG. 7A.

As described above with respect to step 150 of FIG. 1, various BDD reduction rules may be applied to a BDD to reduce the size of the BDD. FIG. 7B illustrates a BDD 750 that represents the result of applying reduction rules to BDD 700.

Once a BDD has been constructed for a set of search queries and a corresponding set of search results, the BDD may be modified, such as adding to the BDD a new pair of corresponding search query and search result, or deleting from the BDD an existing pair of corresponding search query and search result.

FIG. 8A illustrates an example method for adding a new pair of corresponding search query and search result to a BDD representing a set of search queries and a set of corresponding search result according to particular embodiments.

The new pair of corresponding search query and search result may be represented using a new search tuple that includes the search query and the search result (step 810). As described before, the search query may include one or more words, and each word is assigned a word ID. The search result may include one or more web pages, and each web page is assigned a page ID. The new search tuple may be constructed using the process described in step 130 of FIG. 1.

The new search tuple may be represented using a new tuple BDD (step 812). The new tuple BDD may be constructed using the process described in step 131 of FIG. 1.

To add the new tuple BDD to the BDD, an OR operation is performed on the new tuple BDD and the BDD (step 814), which is similar to the process described in step 140 of FIG. 1.

In particular embodiments, various BDD reduction rules may be applied to the BDD to reduce the size of the BDD as much as possible.

FIG. 8B illustrates an example method for deleting an existing pair of corresponding search query and search result to from BDD representing a set of search queries and a set of corresponding search result according to particular embodiments.

An existing pair of corresponding search query and search result in the BDD already has a tuple BDD being constructed. In particular embodiments, the tuple BDD that represents the existing pair of corresponding search query and search result is negated (step 820). In particular embodiments, a BDD may be negated by exchanging all references to the 0 terminal node with references to the 1 terminal node and vice versa.

To delete the existing pair of corresponding search query and search result from the BDD, an AND operation is performed on the negated tuple BDD and the BDD (step 822). The negated tuple BDD thus cancels out the tuple BDD representing pair of corresponding search query and search result the in the BDD.

BDDs have a wide variety of potential applications, especially in many areas of computer science. In particular embodiments, a BDD may be used to cache a set of search queries and a corresponding set of search results, as described with reference to FIG. 1. The BDD may be updated, e.g., adding new search results to the BDD or removing old search results from the BDD, using the methods described with reference to FIGS. 8A and 8B.

Search is one of the most common activities people perform on the Internet. FIG. 9 illustrates an example network environment 910 in which a person may search information on the Internet.

System 910 includes a network 912 coupling one or more clients 914, one or more web servers 916, and an application server 918 to each other. In particular embodiments, network 912 is an Intranet, an extranet, a virtual private network (VPN), a local area network (LAN), a wireless LAN (WLAN), a wide area network (WAN), a metropolitan area network (MAN), a portion of the Internet, or another network 912 or a combination of two or more such networks 912. The present disclosure contemplates any suitable network 912.

One or more links 920 couple a client 914, a web server 916, or application server 918 to network 912. In particular embodiments, one or more links 920 each include one or more wireline, wireless, or optical links 920. In particular embodiments, one or more links 920 each include an intranet, an extranet, a virtual private network (VPN), a LAN, a WLAN, a WAN, a MAN, a portion of the Internet, or another link 20 or a combination of two or more such links 920. The present disclosure contemplates any suitable links 920 coupling clients 914, web servers 916, and application server 918 to network 912.

In particular embodiments, a client 914 enables a user at client 914 to access web pages residing at web servers 916. As an example and not by way of limitation, a client 914 may be a computer system, such as a suitable desktop computer system, notebook computer system, or mobile telephone, having a web browser. A user at client 914 may enter a Uniform Resource Locator (URL) or other address directing the web browser to a web server 916, and the web browser may generate a Hyper Text Transfer Protocol (HTTP) request and communicate the HTTP request to web server 916. Web server 916 may accept the HTTP request and generate and communicate to client 914 a Hyper Text Markup Language (HTML) document responsive to the HTTP request. The HTML document from web server 916 may be a web page the web browser at client 914 may present to the user. The present disclosure contemplates any suitable web pages. As an example and not by way of limitation, a web page may be an Extensible Markup Language (XML) document or an Extensible HyperText Markup Language (XHTML) document. Moreover, the present disclosure contemplates any suitable objects and is not limited to web pages residing at web servers 916. As an example and not by way of limitation, where appropriate, the present disclosure contemplates executables, files, such as, for example, MICROSOFT WORD documents and Portable Document Format (PDF) documents, or other objects residing at database servers, file servers, peer-to-peer networks, or elsewhere.

In particular embodiments, a web server 916 includes one or more servers. The present disclosure contemplates any suitable web servers 916. Moreover, the present disclosure contemplates any suitable clients 914. As an example and not by way of limitation, in addition or as an alternative to having a web browser for accessing web pages residing at web servers 916, a client 914 may have one or more applications for accessing objects residing at one or more database servers, file servers, peer-to-peer networks, or elsewhere.

In response to input from a user at a client 914, client 914 may generate a query for web pages containing one or more particular key words and communicate the query to application server 918. The query including one or more words may be considered a "search query."

In particular embodiments, application server 918 includes hardware, software, or embedded logic component or a combination of two or more such components for receiving and responding to queries from clients 914. As an example and not by way of limitation, application server 918 may receive from a client 914 a search query for web pages containing one or more particular key words, accept the query, and access web search engine 922 to run the query and generate a search result responsive to the query. The search result may include one or more appropriate web pages. Application server 918 may communicate the search result to client 914 for presentation to the user. In particular embodiments, application server 918 includes one or more servers. The present disclosure contemplates any suitable application server 918. As an example and not by way of limitation, application server 918 may include a catalog server providing a point of access enabling users at clients 914 to centrally search for objects across a distributed network, such as an intranet or an extranet.

In particular embodiments, web search engine 922 includes hardware, software, or embedded logic component or a combination of two or more such components for generating and returning search results identifying web pages responsive to search queries from clients 914. The present disclosure contemplates any suitable web search engine 922. As an example and not by way of limitation, web search engine 922 may be BAIDU, GOOGLE, LIVE SEARCH, or YAHOO! SEARCH.

In particular embodiments, to run a query and generate a search result responsive to the query, web search engine 922 accesses web search data 928. As an example and not by way of limitation, web search data 928 may include inverted indexes of web pages residing at web servers 916. The inverted indexes may each includes sets of lists that may each correspond to a unique key word, as described below. Indexing engine 924 may generate one or more of the inverted indexes, and decision diagram engine 926 may generate decision diagrams, such as compact decision diagrams, representing lists of the inverted indexes, as described below. The decision diagrams may compress the lists to facilitate storage or processing. Indexing engine 924, decision diagram engine 926, or both collectively may manipulate inverted indexes or their lists to facilitate queries run by web search engine 922 and the generation of search results. In particular embodiments, indexing engine 924 includes hardware, software, or embedded logic component or a combination of two or more such components for generating and manipulating inverted indexes. In particular embodiments, decision diagram engine 926 includes hardware, software, or embedded logic component or a combination of two or more such components for generating decision diagrams representing lists of inverted indexes and manipulating the represented lists. In particular embodiments, web search engine 922, indexing engine 924, and decision diagram engine 926 are all logically or physically separate from each other. In particular embodiments, web search engine 922 and indexing engine 924 are functionally, logically, or physically combined with each other. As an example and not by way of limitation, indexing engine 924 may functionally, logically, or physically include web search engine 922. In particular embodiments, indexing engine 924 and decision diagram engine 926 are functionally, logically, or physically combined with each other. As an example and not by way of limitation, indexing engine 924 may functionally, logically, or physically include decision diagram engine 926. The present disclosure contemplates any suitable functional, logical, or physical arrangement among web search engine 922, indexing engine 924, and decision diagram engine 926.

In particular embodiments, decision diagram engine maintains a BDD that represents the set of search queries and the set of corresponding search results obtained by web search engine 922. The BDD may be stored in web search data 928. Each time web search engine 922 obtains a new search results in response to a new search query, decision diagram engine 926 updates the BDD stored in web search data 928 accordingly. The stored BDD may then be used to provide search results to subsequent search queries.

For example, consider search query "cat food" illustrated in TABLE 1. Since there are many people having cats as their pets, it is most likely that there are multiple instances where people search for information on cat food on the Internet. One the one hand, every time application server 918 receives a request from any client 914 to query for "cat food," web search engine 922 may perform the search process to generate a search result for search query "cat food." However, this may not be very efficient, especially since it may take some time to run a complete search on network 912 in order to locate all web pages that may contain information on cat food.

Figure 10A:
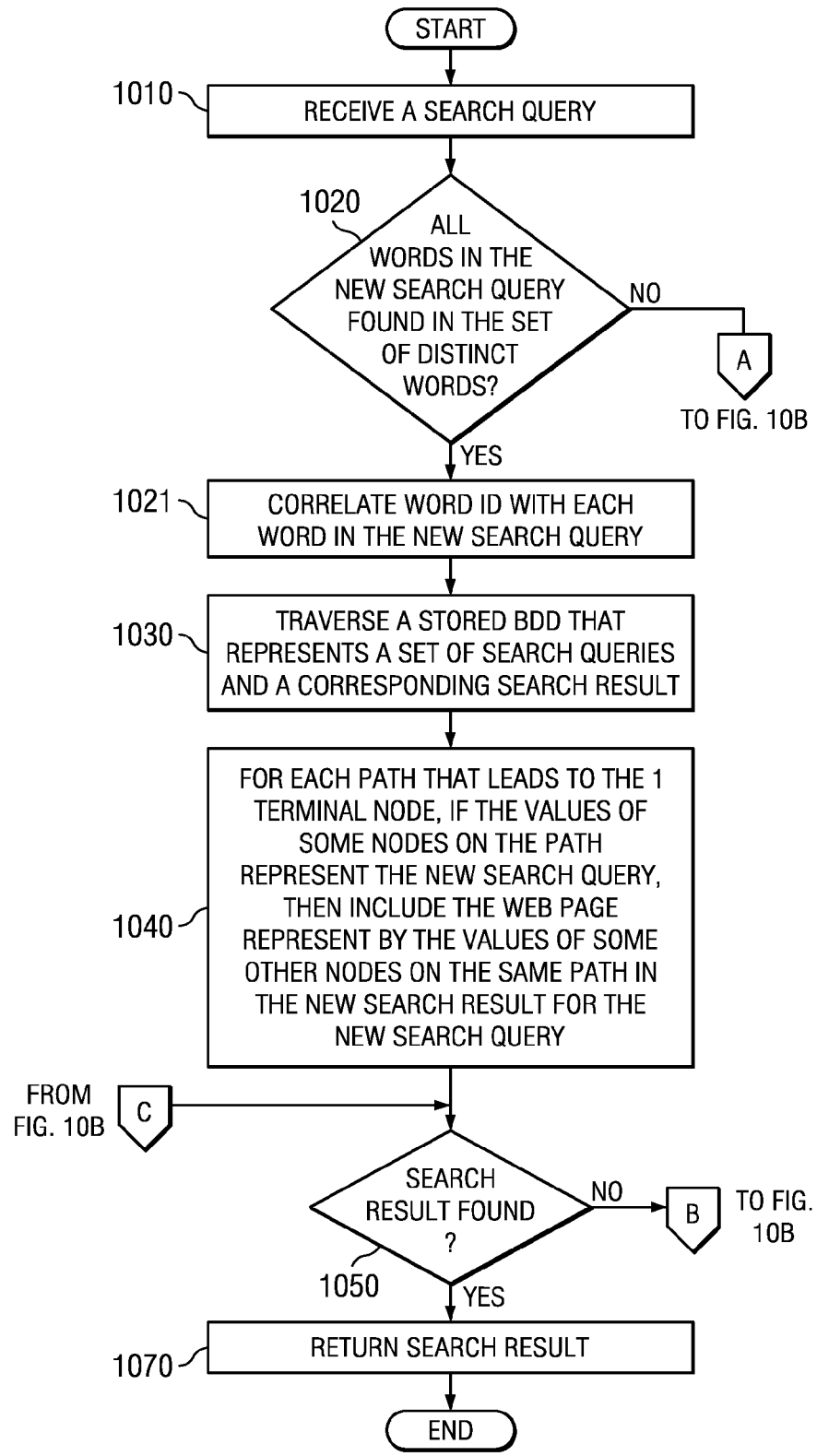
FIGS. 10A-B illustrate an example method for generating a search result for a searching query using a BDD according to particular embodiments.
Figure 10B:
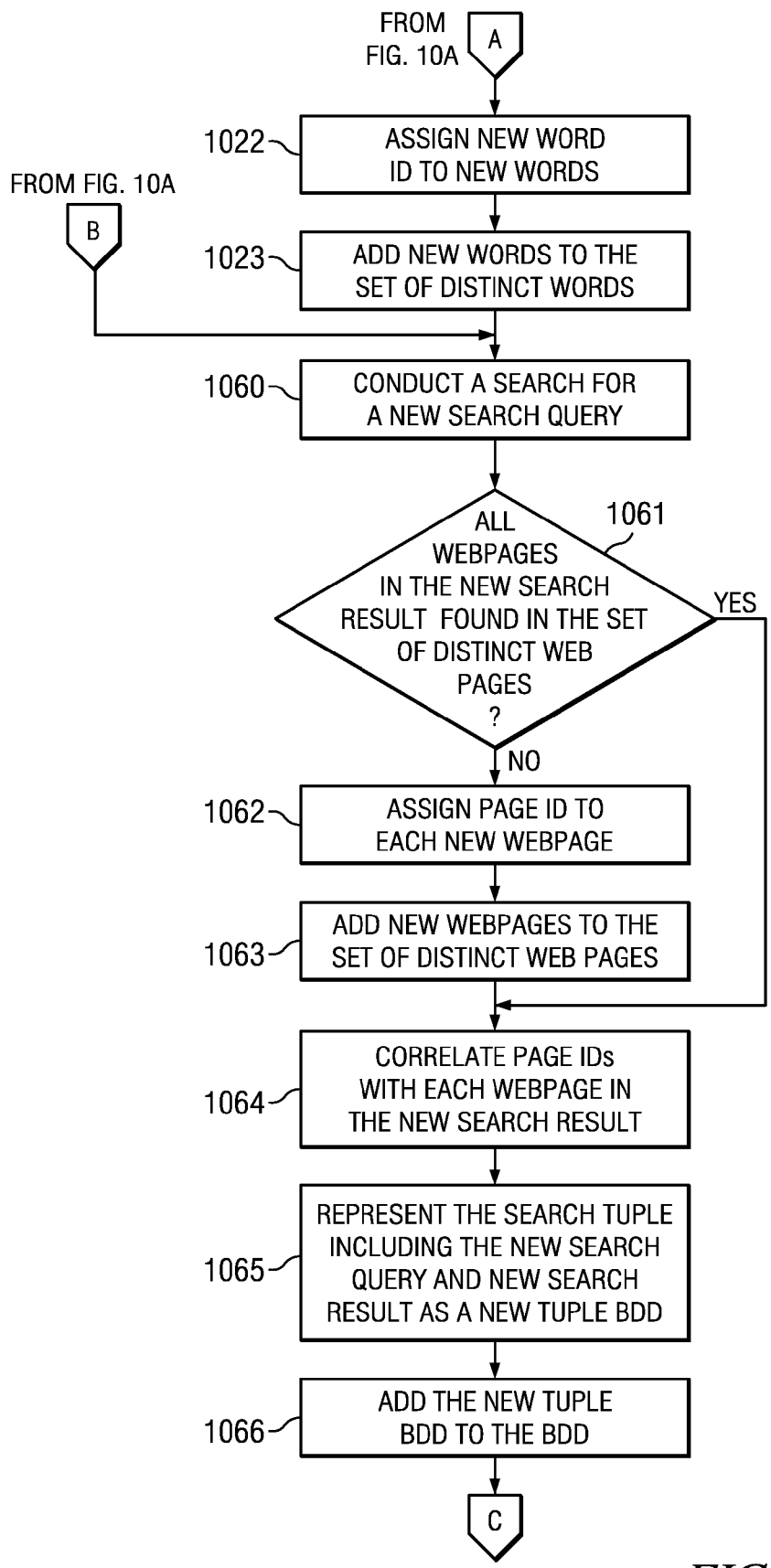

On the other hand, every time application server 918 receives a request from any client 914 to query for "cat food," instead of having web search engine 922 conduct the search process, the BDD stored in web search data 928 may first be processed. FIGS. 10A-B illustrate an example method for generating a new search result for a new search query using a stored BDD. Again, the BDD represents a set of search queries and a corresponding set of search results.

Upon receiving a new search query (step 1010), determine whether all of the words in the new search query are found in the set of distinct words obtained from the set of search queries represented by the BDD, as described in step 110 of FIG. 1 (Step 1020). The new search query, similar to other search queries, includes one or more words.

If any of the words in the new search query is not found in the set of distinct words (step 1020, "NO"), then the new search query is not in the set of search queries represented by the BDD, since the new search query includes at least one new word not previously found in any of the set of search queries represented by the BDD. In this case, no search result is cached for the new search query in the BDD. The new words found in the new search query is each assigned a new word ID (step 1022), and the new words are added to the set of distinct words (step 1023). From here, the process proceeds to step 1060, which is described below.

On the other hand, if all of the words in the new search query are found in the set of distinct words (step 1020, "YES"), then each of the words in the new search query has already been assigned a word ID. The words in the new search query are correlated with their existing word IDs to obtain a query ID for the new search query (step 1021).

For example, considered the BDD that represents the example illustrated in TABLE 1. If the new search query is "car," the word "car" is found in the set of words that appeared in the three search queries in TABLE 1. The search result for search query "car" may be cached in the BDD. On the other hand, if the new search query is "truck," the word "truck" is not found in the set of words that appeared in the three search queries in TABLE 1. The search result for search query "truck" is not cached in the BDD.

The stored BDD is traversed (step 1030). The BDD may have many paths, some leading to the 0 terminal node and others leading to the 1 terminal node. On each path, there are one or more decision nodes. For each path in the BDD that leads to the 1 terminal node, if the values of some of the nodes on the path represent the new search query, then include the web page represented by the values of other decision nodes on the some path in the new search result for the new search query (step 1040).

The binary digits of the word IDs of the words in the new search query are matched against the binary values of the decision nodes on each path in the BDD that leads to the 1 terminal node. For example, consider path 706 illustrated in FIG. 7, which leads to the 1 terminal node.

Suppose the new search query is "car." The word ID, in binary format, for "car" is 1101, as illustrated in TABLE 2. Since BDD 700 is constructed such that all search queries have two words and search query "car" only has one word, 0 digits are added to make up for the second word. Thus, the binary representation for search query "car" becomes 0-0-0-0-1-1-0-1. Traversing down path 706, the binary digits representing the new search query is matched against the values of the decision nodes on path 706. Specifically, the value of decision node $x_1$ is 0; the value of decision node $x_2$ is 0; the value of decision node $x_3$ is 0; the value of decision node $x_4$ is 0; the value of decision node $x_5$ is 1; the value of decision node $x_6$ is 1; the value of decision node $x_7$ is 0; and the value of decision node $x_8$ is 1. At this point, a match is found for search query "car" whose binary representation is 0-0-0-0-1-1-0-1. The values of the last three decision nodes, $y_1$, $y_2$, and $y_3$, on path 706 are 1-0-1, which is the page ID for web page E, as illustrated in TABLE 3. Thus, web page E is included in the search result for search query "car."

Alternatively, suppose the new search query is "food car." Although the phrase does not have much practical meaning, it is used to further explain the matching process. Both words in the new search query, "food" and "car," are found in the set of distinct words, and therefore, step 1020 has evaluated to TRUE (step 1020, "YES"). The word ID for word "food" is 1100, and the word ID for word "car" is 1101, as illustrated in TABLE 2. Thus, the binary digits that represent search query "food car" are 1-1-0-0-1-1-0-1, combining the two word IDs.

Searching through all the paths in BDD 700 that lead to the 1 terminal node does not yield any combination of values of variables on any path that matches the binary sequence 1-1-0-0-1-1-0-1, because search query "food car" is not cached in BDD 700. In this case, no web page is found that correspond to search query "food car."

Once the entire BDD has been traversed, determine whether a search result is found for the new search query (step 1050). In particular embodiments, if no web page is found in the BDD for the new search query based on the matching process, then no search result is found for the new search query. Conversely, if one or more web pages are found in the BDD for the new search query based on the matching process, then a search result is found for the new search query.

If a search result is found for the new search query (step 1050, "YES"), then the search result is communicated to the user requesting the search (step 1070). On the other hand, if no search result is found for the new search query (step 1050, "NO"), the process proceeds to step 1060.

A search on the Internet is conducted for the new search query using any suitable search engine (step 1060). A new search result is generated in response, which may include one or more web pages. Determine whether all the web pages in the new search result is found in the set of distinct web pages included in the search results represented by the BDD (step 1061), as obtained in step 120 of FIG. 1.

If any of the web pages included in the new search result is not found in the set of distinct web pages (step 1061, "NO"), then assign a new page ID to each of the new web page (step 1062) and add the new web pages to the set of distinct web pages (step 1063). On the other hand, if all of the web pages included in the new search result are found in the set of distinct web pages (step 1061, "YES"), then the process proceeds directly to step 1064, by passing steps 1062 and 1063. For each of the web pages found in the set of distinct web pages, correlate the existing page ID with the web page (step 1064).

Represent the pair of new search query and new search result using a new tuple BDD (step 1065) using the process described in steps 130 and 131 of FIG. 1. Add the new tuple BDD to the BDD (step 1066) using the process described in FIG. 8A. The pair of new search query and new search result is now also cached in the BDD so that subsequently, the BDD may be used to provide search result for this search query as well. The new search result is communicated to the user requesting the search (step 1070).

Particular embodiments may be implemented as hardware, software, or a combination of hardware and software. As an example and not by way of limitation, one or more computer systems may execute particular logic or software to perform one or more steps of one or more processes described or illustrated herein. One or more of the computer systems may be unitary or distributed, spanning multiple computer systems or multiple datacenters, where appropriate. The present disclosure contemplates any suitable computer system. In particular embodiments, performing one or more steps of one or more processes described or illustrated herein need not necessarily be limited to one or more particular geographic locations and need not necessarily have temporal limitations. As an example and not by way of limitation, one or more computer systems may carry out their functions in "real time," "offline," in "batch mode," otherwise, or in a suitable combination of the foregoing, where appropriate. One or more of the computer systems may carry out one or more portions of their functions at different times, at different locations, using different processing, where appropriate. Herein, reference to logic may encompass software, and vice versa, where appropriate. Reference to software may encompass one or more computer programs, and vice versa, where appropriate. Reference to software may encompass data, instructions, or both, and vice versa, where appropriate. Similarly, reference to data may encompass instructions, and vice versa, where appropriate.

One or more computer-readable storage media may store or otherwise embody software implementing particular embodiments. A computer-readable medium may be any medium capable of carrying, communicating, containing, holding, maintaining, propagating, retaining, storing, transmitting, transporting, or otherwise embodying software, where appropriate. A computer-readable medium may be a biological, chemical, electronic, electromagnetic, infrared, magnetic, optical, quantum, or other suitable medium or a combination of two or more such media, where appropriate. A computer-readable medium may include one or more nanometer-scale components or otherwise embody nanometer-scale design or fabrication. Example computer-readable storage media include, but are not limited to, compact discs (CDs), field-programmable gate arrays (FPGAs), floppy disks, floptical disks, hard disks, holographic storage devices, integrated circuits (ICs) (such as application-specific integrated circuits (ASICs)), magnetic tape, caches, programmable logic devices (PLDs), random-access memory (RAM) devices, read-only memory (ROM) devices, semiconductor memory devices, and other suitable computer-readable storage media.

Software implementing particular embodiments may be written in any suitable programming language (which may be procedural or object oriented) or combination of programming languages, where appropriate. Any suitable type of computer system (such as a single- or multiple-processor computer system) or systems may execute software implementing particular embodiments, where appropriate. A general-purpose computer system may execute software implementing particular embodiments, where appropriate.

Figure 11:
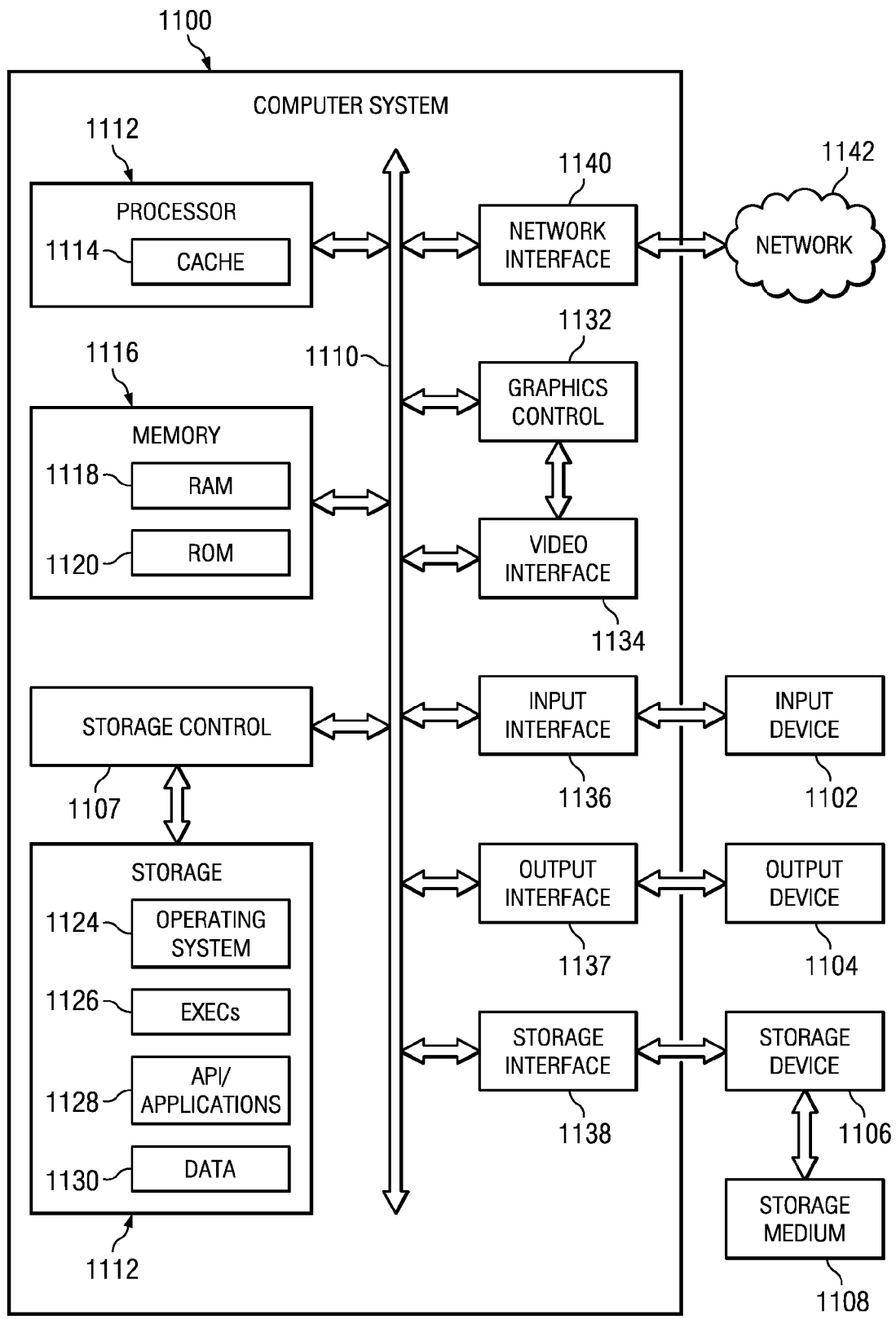
FIG. 11 illustrates an example computer system according to particular embodiments.

For example, FIG. 11 illustrates an example computer system 1100 suitable for implementing one or more portions of particular embodiments. Although the present disclosure describes and illustrates a particular computer system 1100 having particular components in a particular configuration, the present disclosure contemplates any suitable computer system having any suitable components in any suitable configuration. Moreover, computer system 1100 may have take any suitable physical form, such as for example one or more integrated circuit (ICs), one or more printed circuit boards (PCBs), one or more handheld or other devices (such as mobile telephones or PDAs), one or more personal computers, or one or more super computers.

Computer system 1100 may have one or more input devices 1102 (which may include a keypad, keyboard, mouse, stylus, etc.), one or more output devices 1104 (which may include one or more displays, one or more speakers, one or more printers, etc.), one or more storage devices 1106, and one or more storage medium 1108. An input device 1102 may be external or internal to computer system 1100. An output device 1104 may be external or internal to computer system 1100. A storage device 1106 may be external or internal to computer system 1100. A storage medium 1108 may be external or internal to computer system 1100.

System bus 1110 couples subsystems of computer system 1100 to each other. Herein, reference to a bus encompasses one or more digital signal lines serving a common function. The present disclosure contemplates any suitable system bus 1110 including any suitable bus structures (such as one or more memory buses, one or more peripheral buses, one or more a local buses, or a combination of the foregoing) having any suitable bus architectures. Example bus architectures include, but are not limited to, Industry Standard Architecture (ISA) bus, Enhanced ISA (EISA) bus, Micro Channel Architecture (MCA) bus, Video Electronics Standards Association local (VLB) bus, Peripheral Component Interconnect (PCI) bus, PCI-Express bus (PCI-X), and Accelerated Graphics Port (AGP) bus.

Computer system 1100 includes one or more processors 1112 (or central processing units (CPUs)). A processor 1112 may contain a cache 1114 for temporary local storage of instructions, data, or computer addresses. Processors 1112 are coupled to one or more storage devices, including memory 1116. Memory 1116 may include random access memory (RAM) 1118 and read-only memory (ROM) 1120. Data and instructions may transfer bidirectionally between processors 1112 and RAM 1118. Data and instructions may transfer unidirectionally to processors 1112 from ROM 1120. RAM 1118 and ROM 1120 may include any suitable computer-readable storage media.

Computer system 1100 includes fixed storage 1122 coupled bi-directionally to processors 1112. Fixed storage 1122 may be coupled to processors 1112 via storage control unit 1107. Fixed storage 1122 may provide additional data storage capacity and may include any suitable computer-readable storage media. Fixed storage 1122 may store an operating system (OS) 1124, one or more executables (EX-ECs) 1126, one or more applications or programs 1128, data 1130 and the like. Fixed storage 1122 is typically a secondary storage medium (such as a hard disk) that is slower than primary storage. In appropriate cases, the information stored by fixed storage 1122 may be incorporated as virtual memory into memory 1116.

Processors 1112 may be coupled to a variety of interfaces, such as, for example, graphics control 1132, video interface 1134, input interface 1136, output interface 1137, and storage interface 1138, which in turn may be respectively coupled to appropriate devices. Example input or output devices include, but are not limited to, video displays, track balls, mice, keyboards, microphones, touch-sensitive displays, transducer card readers, magnetic or paper tape readers, tablets, styli, voice or handwriting recognizers, biometrics readers, or computer systems. Network interface 1140 may couple processors 1112 to another computer system or to network 1142. With network interface 1140, processors 1112 may receive or send information from or to network 1142 in the course of performing steps of particular embodiments. Particular embodiments may execute solely on processors 1112. Particular embodiments may execute on processors 1112 and on one or more remote processors operating together.

In a network environment, where computer system 1100 is connected to network 1142, computer system 1100 may communicate with other devices connected to network 1142. Computer system 1100 may communicate with network 1142 via network interface 1140. For example, computer system 1100 may receive information (such as a request or a response from another device) from network 1142 in the form of one or more incoming packets at network interface 1140 and memory 1116 may store the incoming packets for subsequent processing. Computer system 1100 may send information (such as a request or a response to another device) to network 1142 in the form of one or more outgoing packets from network interface 1140, which memory 1116 may store prior to being sent. Processors 1112 may access an incoming or outgoing packet in memory 1116 to process it, according to particular needs.

Particular embodiments involve one or more computer-storage products that include one or more computer-readable storage media that embody software for performing one or more steps of one or more processes described or illustrated herein. In particular embodiments, one or more portions of the media, the software, or both may be designed and manufactured specifically to perform one or more steps of one or more processes described or illustrated herein. In addition or as an alternative, in particular embodiments, one or more portions of the media, the software, or both may be generally available without design or manufacture specific to processes described or illustrated herein. Example computer-readable storage media include, but are not limited to, CDs (such as CD-ROMs), FPGAs, floppy disks, floptical disks, hard disks, holographic storage devices, ICs (such as ASICs), magnetic tape, caches, PLDs, RAM devices, ROM devices, semiconductor memory devices, and other suitable computer-readable storage media. In particular embodiments, software may be machine code which a compiler may generate or one or more files containing higher-level code which a computer may execute using an interpreter.

As an example and not by way of limitation, memory 1116 may include one or more computer-readable storage media embodying software and computer system 1100 may provide particular functionality described or illustrated herein as a result of processors 1112 executing the software. Memory 1116 may store and processors 1112 may execute the software. Memory 1116 may read the software from the computer-readable storage media in mass storage device 1116 embodying the software or from one or more other sources via network interface 1140. When executing the software, processors 1112 may perform one or more steps of one or more processes described or illustrated herein, which may include defining one or more data structures for storage in memory 1116 and modifying one or more of the data structures as directed by one or more portions the software, according to particular needs. In addition or as an alternative, computer system 1100 may provide particular functionality described or illustrated herein as a result of logic hardwired or otherwise embodied in a circuit, which may operate in place of or together with software to perform one or more steps of one or more processes described or illustrated herein. The present disclosure encompasses any suitable combination of hardware and software, according to particular needs.

Although the present disclosure describes or illustrates particular operations as occurring in a particular order, the present disclosure contemplates any suitable operations occurring in any suitable order. Moreover, the present disclosure contemplates any suitable operations being repeated one or more times in any suitable order. Although the present disclosure describes or illustrates particular operations as occurring in sequence, the present disclosure contemplates any suitable operations occurring at substantially the same time, where appropriate. Any suitable operation or sequence of operations described or illustrated herein may be interrupted, suspended, or otherwise controlled by another process, such as an operating system or kernel, where appropriate. The acts can operate in an operating system environment or as stand-alone routines occupying all or a substantial part of the system processing.

The present disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend.

What is claimed is:

1. A method comprising:
    constructing, by one or more computer systems, a plurality of first binary decision diagrams (BDDs), each of the first BDDs representing a different one of a plurality of words, each of the words having a unique word identifier (ID), each first BDD being constructed based on the word ID of the word represented by the first BDD;
    constructing, by the one or more computer systems, a plurality of second BDDs, each of the second BDDs representing a different one of a plurality of search queries, each of the search queries comprising one or more of the words, each second BDD being constructed by performing an AND operation on the first BDDs representing the words in the search query represented by the second BDD, wherein the plurality of search queries comprise a plurality of cached searched queries that have been previously submitted to a search engine;
    constructing, by the one or more computer systems, a plurality of third BDDs, each of the third BDDs representing a different one of a plurality of web pages, each of the web pages having a unique page ID, each of the third BDDs being constructed based on the page ID of the web page represented by the third BDD;
    constructing, by the one or more computer systems, a plurality of fourth BDDs, each of the fourth BDDs representing a different one of a plurality of search results generated in response to the search queries, each of the search results comprising one or more of the web pages, each fourth BDD being constructed by performing an OR operation on the third BDDs representing the web pages in the search result represented by the fourth BDD;
    constructing, by the one or more computer systems, a plurality of fifth BDDs, each of the fifth BDDs representing a different one of a plurality of search tuples, each of the search tuples comprising a different one of the search queries and a different one of the search results corresponding to the search query, each fifth BDD being constructed by performing an AND operation on the second BDD representing the search query and the fourth BDD representing the search result that the search tuple represented by the fifth BDD; and
    constructing, by the one or more computer systems, a sixth BDD by performing an OR operation on the fifth BDDs, the sixth BDD representing the search queries and the search results.

2. The method of claim 1, wherein:
    the sixth BDD comprises:
    a binary 0 terminal node;
    a binary 1 terminal node; and
    a plurality of paths, each path comprising a plurality of decision nodes and leading to either the 0 terminal node or the 1 terminal node, and
    for each of the paths that leads to the 1 terminal node, a web page represented by first one or more of the decision nodes on the path is included in a search result for a search query represented by second one or more of the decision nodes on the path.

3. The method of claim 2, further comprising:
    receiving, by the one or more computer systems, a new search query, the new search query comprising one or more of the words;
    searching, by the one or more computer systems, through the sixth BDD;
    for each of the paths that leads to the 1 terminal node, if the search query on the path equals the new search query, then including, by the one or more computer systems, all web pages on the path in a search result for the new search query; and
    returning, by the one or more computer systems, the search result in response to the new search query.

4. The method of claim 1, wherein constructing one of the first BDDs comprises:
    representing the word ID of the word represented by the first BDD in binary format;
    representing a plurality of binary digits in the word ID with a plurality of variables, each variable representing a different one of the binary digits; and
    constructing the first BDD with the variables as a plurality of decision nodes.

5. The method of claim 1, wherein constructing one of the second BDDs comprises performing an AND operation on the first BDDs representing the words in the search query represented by the second BDD in an order of the words appearing in the search query.

6. The method of claim 1, wherein constructing one of the third BDDs comprises:
    representing the page ID of the web page represented by the third BDD in binary format;
    representing a plurality of binary digits in the page ID with a plurality of variables, each variable representing a different one of the binary digits; and
    constructing the third BDD with the variables as a plurality of decision nodes.

7. The method of claim 1, further comprising adding, by the one or more computer systems, a new fifth BDD representing a new search tuple to the sixth BDD by performing an OR operation on the sixth BDD and the new fifth BDD.

8. The method of claim 1, further comprising deleting, by the one or more computer systems, one of the fifth BDDs representing one of the search tuples from the sixth BDD, comprising:
    negating the fifth BDD; and
    performing an AND operating on the sixth BDD and the negated fifth BDD.

9. The method of claim 1, further comprising maximally reducing, by the one or more computer systems, the sixth BDD using one or more BDD reduction rules.

10. The method of claim 1, further comprising maximally reducing, by the one or more computer systems, the fourth BDD and each of the fifth BDDs using one or more BDD reduction rules.

11. The method of claim 1, further comprising partitioning, by the one or more computer systems, the sixth BDD into a plurality of seventh BDDs, wherein a sum of sizes of the seventh BDDs is less than a size of the sixth BDD.

12. The method of claim 11, further comprising storing, by the one or more computer systems, the plurality of seventh BDDs.

13. The method of claim 1, further comprising storing, by the one or more computer systems, the sixth BDD.

14. A method comprising:
assigning, by one or more computer systems, a plurality of word identifiers (IDs), each of the word IDs being assigned to a different one of a plurality of words, each of the words appearing at least once in a plurality of search queries, each of the search queries comprising one or more of the words, wherein the plurality of search queries comprise a plurality of cached search queries that have been previously submitted to a search engine;
assigning, by the one or more computer systems, a plurality of page IDs, each of the page IDs being assigned to a different one of a plurality of web pages, each of the web pages being included at least once in a plurality of search results generated in response to the search queries, each of the search results comprising one or more of the web pages;
obtaining, by the one or more computer systems, a plurality of query IDs, each of the query IDs identifying a different one of the search queries, each of the query IDs being obtained by combining the word IDs identifying the words comprised in the search query identified by the query ID; and
constructing, by the one or more computer systems, a BDD representing the search queries and the search results, the BDD comprising:
a binary 0 terminal node;
a binary 1 terminal node; and
a plurality of paths, each path comprising a plurality of decision nodes and leading to either the 0 terminal node or the 1 terminal node, each decision node represents a binary digit in one of the query IDs or one of the page IDs in binary format, and for each of the paths that leads to the 1 terminal node, a web page represented by first one or more of the decision nodes on the path is included in a search result for a search query represented by second one or more of the decision nodes on the path.

15. The method of claim 14, further comprising:
receiving, by the one or more computer systems, a new search query, the new search query comprising one or more of the words;
obtaining, by the one or more computer systems, a new query ID for the new search query by combining the word IDs identifying the words comprised in the new search query;
searching, by the one or more computer systems, through the BDD;
for each of the paths that leads to the 1 terminal node, if the search query on the path equals the new search query, then including, by the one or more computer systems, all web pages on the path in a search result for the new search query; and
returning, by the one or more computer systems, the search result in response to the new search query.

16. The method of claim 14, further comprising:
constructing, by the one or more computer systems, a second BDD representing a second search query and a second search result generated in response to the second search query, the second search query comprising one or more of the words, the second search result comprising one or more of the web pages;
adding, by the one or more computer systems, the second BDD to the BDD by performing an OR operation on the BDD and the second BDD.

17. The method of claim 14, further comprising:
negating, by the one or more computer systems, a third BDD representing one of the search queries and one of the search results generated in response to the search query;
deleting, by the one or more computer systems, the third BDD from the BDD by performing an AND operating on the BDD and the negated third BDD.

18. The method of claim 14, further comprising maximally reducing, by the one or more computer systems, the BDD using one or more BDD reduction rules.

19. The method of claim 14, further comprising partitioning, by the one or more computer systems, the BDD into a plurality of fourth BDDs, wherein a sum of sizes of the fourth BDDs is less than a size of the BDD.

20. The method of claim 19, further comprising storing, by the one or more computer systems, the plurality of fourth BDDs.

21. The method of claim 14, further comprising storing, by the one or more computer systems, the BDD.

22. One or more non-transitory computer-readable storage media embodying software for execution by one or more computer systems and being operable when executed to:
construct a plurality of first binary decision diagrams (BDDs), each of the first BDDs representing a different one of a plurality of words, each of the words having a unique word identifier (ID), each first BDD being constructed based on the word ID of the word represented by the first BDD;
construct a plurality of second BDDs, each of the second BDDs representing a different one of a plurality of search queries, each of the search queries comprising one or more of the words, each second BDD being constructed by performing an AND operation on the first BDDs representing the words in the search query represented by the second BDD, wherein the plurality of search queries comprise a plurality of cached searched queries that have been previously submitted to a search engine;
construct a plurality of third BDDs, each of the third BDDs representing a different one of a plurality of web pages, each of the web pages having a unique page ID, each of the third BDDs being constructed based on the page ID of the web page represented by the third BDD;
construct a plurality of fourth BDDs, each of the fourth BDDs representing a different one of a plurality of search results generated in response to the search queries, each of the search results comprising one or more of the web pages, each fourth BDD being constructed by performing an OR operation on the third BDDs representing the web pages in the search result represented by the fourth BDD;
construct a plurality of fifth BDDs, each of the fifth BDDs representing a different one of a plurality of search tuples, each of the search tuples comprising a different one of the search queries and a different one of the search results corresponding to the search query, each fifth BDD being constructed by performing an AND operation on the second BDD representing the search query and the fourth BDD representing the search result that the search tuple represented by the fifth BDD; and constructing a sixth BDD by performing an OR operation on the fifth BDDs, the sixth BDD representing the search queries and the search results.

23. The media of claim 22, wherein:
the sixth BDD comprises:
a binary 0 terminal node;
a binary 1 terminal node; and
a plurality of paths, each path comprising a plurality of decision nodes and leading to either the 0 terminal node or the 1 terminal node, and
for each of the paths that leads to the 1 terminal node, a web page represented by first one or more of the decision nodes on the path is included in a search result for a search query represented by second one or more of the decision nodes on the path.

24. The media of claim 23, wherein the plurality of computer-readable instructions, when executed, are further operable to cause one or more computing devices to:
receive a new search query, the new search query comprising one or more of the words;
search through the sixth BDD;
for each of the paths that leads to the 1 terminal node, if the search query on the path equals the new search query, then include all web pages on the path in a search result for the new search query; and
return the search result in response to the new search query.

25. The media of claim 22, wherein to construct one of the first BDDs comprises:
represent the word ID of the word represented by the first BDD in binary format;
represent a plurality of binary digits in the word ID with a plurality of variables, each variable representing a different one of the binary digits; and
construct the first BDD with the variables as a plurality of decision nodes.

26. The media of claim 22, wherein to construct one of the second BDDs comprises perform an AND operation on the first BDDs representing the words in the search query represented by the second BDD in an order of the words appearing in the search query.

27. The media of claim 22, wherein to construct one of the third BDDs comprises:
represent the page ID of the web page represented by the third BDD in binary format;
represent a plurality of binary digits in the page ID with a plurality of variables, each variable representing a different one of the binary digits; and
construct the third BDD with the variables as a plurality of decision nodes.

28. The media of claim 22, wherein the plurality of computer-readable instructions, when executed, are further operable to cause one or more computing devices to add a new fifth BDD representing a new search tuple to the sixth BDD by performing an OR operation on the sixth BDD and the new fifth BDD.

29. The media of claim 22, wherein the plurality of computer-readable instructions, when executed, are further operable to cause one or more computing devices to delete one of the fifth BDDs representing one of the search tuples from the sixth BDD, comprising:
negate the fifth BDD; and
perform an AND operating on the sixth BDD and the negated fifth BDD.

30. The media of claim 22, wherein the plurality of computer-readable instructions, when executed, are further operable to cause one or more computing devices to maximally reduce the sixth BDD using one or more BDD reduction rules.

31. The media of claim 22, wherein the plurality of computer-readable instructions, when executed, are further operable to cause one or more computing devices to maximally reduce the fourth BDD and each of the fifth BDDs using one or more BDD reduction rules.

32. The media of claim 22, wherein the plurality of computer-readable instructions, when executed, are further operable to cause one or more computing devices to partition the sixth BDD into a plurality of seventh BDDs, wherein a sum of sizes of the seventh BDDs is less than a size of the sixth BDD.

33. The media of claim 32, wherein the plurality of computer-readable instructions, when executed, are further operable to cause one or more computing devices to store the plurality of seventh BDDs.

34. The media of claim 22, wherein the plurality of computer-readable instructions, when executed, are further operable to cause one or more computing devices to store the sixth BDD.

35. One or more non-transitory computer-readable storage media embodying software operable when executed by one or more computer systems to:
assign a plurality of word identifiers (IDs), each of the word IDs being assigned to a different one of a plurality of words, each of the words appearing at least once in a plurality of search queries, each of the search queries comprising one or more of the words, wherein the plurality of search queries comprise a plurality of cached search queries that have been previously submitted to a search engine;
assign a plurality of page IDs, each of the page IDs being assigned to a different one of a plurality of web pages, each of the web pages being included at least once in a plurality of search results generated in response to the search queries, each of the search results comprising one or more of the web pages;
obtain a plurality of query IDs, each of the query IDs identifying a different one of the search queries, each of the query IDs being obtained by combining the word IDs identifying the words comprised in the search query identified by the query ID; and
construct a BDD representing the search queries and the search results, the BDD comprising:
a binary 0 terminal node;
a binary 1 terminal node; and
a plurality of paths, each path comprising a plurality of decision nodes and leading to either the 0 terminal node or the 1 terminal node, each decision node represents a binary digit in one of the query IDs or one of the page IDs in binary format, and for each of the paths that leads to the 1 terminal node, a web page represented by first one or more of the decision nodes on the path is included in a search result for a search query represented by second one or more of the decision nodes on the path.

36. The media of claim 35, wherein the plurality of computer-readable instructions, when executed, are further operable to cause one or more computing devices to:
receive a new search query, the new search query comprising one or more of the words;
obtain a new query ID for the new search query by combining the word IDs identifying the words comprised in the new search query;
search through the BDD;

for each of the paths that leads to the 1 terminal node, if the search query on the path equals the new search query, then include all web pages on the path in a search result for the new search query; and return the search result in response to the new search query.

37. The media of claim 35, wherein the plurality of computer-readable instructions, when executed, are further operable to cause one or more computing devices to:

construct a second BDD representing a second search query and a second search result generated in response to the second search query, the second search query comprising one or more of the words, the second search result comprising one or more of the web pages;

add the second BDD to the BDD by performing an OR operation on the BDD and the second BDD.

38. The media of claim 35, wherein the plurality of computer-readable instructions, when executed, are further operable to cause one or more computing devices to:

negate a third BDD representing one of the search queries and one of the search results generated in response to the search query;

delete the third BDD from the BDD by performing an AND operating on the BDD and the negated third BDD.

39. The media of claim 35, wherein the plurality of computer-readable instructions, when executed, are further operable to cause one or more computing devices to maximally reduce the BDD using one or more BDD reduction rules.

40. The media of claim 35, wherein the plurality of computer-readable instructions, when executed, are further operable to cause one or more computing devices to partition the BDD into a plurality of fourth BDDs, wherein a sum of sizes of the fourth BDDs is less than a size of the BDD.

41. The media of claim 40, wherein the plurality of computer-readable instructions, when executed, are further operable to cause one or more computing devices to store the plurality of fourth BDDs.

42. The media of claim 35, wherein the plurality of computer-readable instructions, when executed, are further operable to cause one or more computing devices to store the BDD.

43. A system comprising:

a memory comprising instructions executable by one or more processors; and one or more processors coupled to the memory and operable to execute the instructions, the one or more processors being operable when executing the instructions to:

construct a plurality of first binary decision diagrams (BDDs), each of the first BDDs representing a different one of a plurality of words, each of the words having a unique word identifier (ID), each first BDD being constructed based on the word ID of the word represented by the first BDD;

construct a plurality of second BDDs, each of the second BDDs representing a different one of a plurality of search queries, each of the search queries comprising one or more of the words, each second BDD being constructed by performing an AND operation on the first BDDs representing the words in the search query represented by the second BDD, wherein the plurality of search queries comprise a plurality of cached searched queries that have been previously submitted to a search engine;

construct a plurality of third BDDs, each of the third BDDs representing a different one of a plurality of web pages, each of the web pages having a unique page ID, each of the third BDDs being constructed based on the page ID of the web page represented by the third BDD;

construct a plurality of fourth BDDs, each of the fourth BDDs representing a different one of a plurality of search results generated in response to the search queries, each of the search results comprising one or more of the web pages, each fourth BDD being constructed by performing an OR operation on the third BDDs representing the web pages in the search result represented by the fourth BDD;

construct a plurality of fifth BDDs, each of the fifth BDDs representing a different one of a plurality of search tuples, each of the search tuples comprising a different one of the search queries and a different one of the search results corresponding to the search query, each fifth BDD being constructed by performing an AND operation on the second BDD representing the search query and the fourth BDD representing the search result that the search tuple represented by the fifth BDD; and constructing a sixth BDD by performing an OR operation on the fifth BDDs, the sixth BDD representing the search queries and the search results.

44. The system of claim 43, wherein:

the sixth BDD comprises:

a binary 0 terminal node;

a binary 1 terminal node; and a plurality of paths, each path comprising a plurality of decision nodes and leading to either the 0 terminal node or the 1 terminal node, and for each of the paths that leads to the 1 terminal node, a web page represented by first one or more of the decision nodes on the path is included in a search result for a search query represented by second one or more of the decision nodes on the path.

45. The system of claim 44, wherein the one or more processors are further operable, when executing the instructions, to:

receive a new search query, the new search query comprising one or more of the words;

search through the sixth BDD;

for each of the paths that leads to the 1 terminal node, if the search query on the path equals the new search query, then include all web pages on the path in a search result for the new search query; and return the search result in response to the new search query.

46. The system of claim 43, wherein to construct one of the first BDDs comprises:

represent the word ID of the word represented by the first BDD in binary format;

represent a plurality of binary digits in the word ID with a plurality of variables, each variable representing a different one of the binary digits; and construct the first BDD with the variables as a plurality of decision nodes.

47. The system of claim 43, wherein to construct one of the second BDDs comprises perform an AND operation on the first BDDs representing the words in the search query represented by the second BDD in an order of the words appearing in the search query.

48. The system of claim 43, wherein to construct one of the third BDDs comprises:

represent the page ID of the web page represented by the third BDD in binary format;

represent a plurality of binary digits in the page ID with a plurality of variables, each variable representing a different one of the binary digits; and construct the third BDD with the variables as a plurality of decision nodes.

49. The system of claim 43, wherein the one or more processors are further operable, when executing the instructions, to add a new fifth BDD representing a new search tuple to the sixth BDD by performing an OR operation on the sixth BDD and the new fifth BDD.

50. The system of claim 43, wherein the one or more processors are further operable, when executing the instructions, to delete one of the fifth BDDs representing one of the search tuples from the sixth BDD, comprising:
negate the fifth BDD; and
perform an AND operating on the sixth BDD and the negated fifth BDD.

51. The system of claim 43, wherein the one or more processors are further operable, when executing the instructions, to maximally reduce the sixth BDD using one or more BDD reduction rules.

52. The system of claim 43, wherein the one or more processors are further operable, when executing the instructions, to maximally reduce the fourth BDD and each of the fifth BDDs using one or more BDD reduction rules.

53. The system of claim 43, wherein the one or more processors are further operable, when executing the instructions, to partition the sixth BDD into a plurality of seventh BDDs, wherein a sum of sizes of the seventh BDDs is less than a size of the sixth BDD.

54. The system of claim 53, wherein the one or more processors are further operable, when executing the instructions, to store the plurality of seventh BDDs.

55. The system of claim 43, wherein the one or more processors are further operable, when executing the instructions, to store the sixth BDD.

56. A system comprising:
a memory comprising instructions executable by one or more processors; and
one or more processors coupled to the memory and operable to execute the instructions, the one or more processors being operable when executing the instructions to:
assign a plurality of word identifiers (IDs), each of the word IDs being assigned to a different one of a plurality of words, each of the words appearing at least once in a plurality of search queries, each of the search queries comprising one or more of the words, wherein the plurality of search queries comprise a plurality of cached search queries that have been previously submitted to a search engine;
assign a plurality of page IDs, each of the page IDs being assigned to a different one of a plurality of web pages, each of the web pages being included at least once in a plurality of search results generated in response to the search queries, each of the search results comprising one or more of the web pages;
obtain a plurality of query IDs, each of the query IDs identifying a different one of the search queries, each of the query IDs being obtained by combining the word IDs identifying the words comprised in the search query identified by the query ID; and
construct a BDD representing the search queries and the search results, the BDD comprising:
a binary 0 terminal node;
a binary 1 terminal node; and
a plurality of paths, each path comprising a plurality of decision nodes and leading to either the 0 terminal node or the 1 terminal node, each decision node represents a binary digit in one of the query IDs or one of the page IDs in binary format, and for each of the paths that leads to the 1 terminal node, a web page represented by first one or more of the decision nodes on the path is included in a search result for a search query represented by second one or more of the decision nodes on the path.

57. The system of claim 56, wherein the one or more processors are further operable, when executing the instructions, to:
receive a new search query, the new search query comprising one or more of the words;
obtain a new query ID for the new search query by combining the word IDs identifying the words comprised in the new search query;
search through the BDD;
for each of the paths that leads to the 1 terminal node, if the search query on the path equals the new search query, then include all web pages on the path in a search result for the new search query; and
return the search result in response to the new search query.

58. The system of claim 56, wherein the one or more processors are further operable, when executing the instructions, to:
construct a second BDD representing a second search query and a second search result generated in response to the second search query, the second search query comprising one or more of the words, the second search result comprising one or more of the web pages;
add the second BDD to the BDD by performing an OR operation on the BDD and the second BDD.

59. The system of claim 56, wherein the one or more processors are further operable, when executing the instructions, to:
negate a third BDD representing one of the search queries and one of the search results generated in response to the search query;
delete the third BDD from the BDD by performing an AND operating on the BDD and the negated third BDD.

60. The system of claim 56, wherein the one or more processors are further operable, when executing the instructions, to maximally reduce the BDD using one or more BDD reduction rules.

61. The system of claim 56, wherein the one or more processors are further operable, when executing the instructions, to partition the BDD into a plurality of fourth BDDs, wherein a sum of sizes of the fourth BDDs is less than a size of the BDD.

62. The system of claim 61, wherein the one or more processors are further operable, when executing the instructions, to store the plurality of fourth BDDs.

63. The system of claim 56, wherein the one or more processors are further operable, when executing the instructions, to store the BDD.

64. A system comprising:
means for constructing a plurality of first binary decision diagrams (BDDs), each of the first BDDs representing a different one of a plurality of words, each of the words having a unique word identifier (ID), each first BDD being constructed based on the word ID of the word represented by the first BDD;
means for constructing a plurality of second BDDs, each of the second BDDs representing a different one of a plurality of search queries, each of the search queries comprising one or more of the words, each second BDD being constructed by performing an AND operation on the first BDDs representing the words in the search query represented by the second BDD, wherein the plurality of search queries comprise a plurality of cached searched queries that have been previously submitted to a search engine;

means for constructing a plurality of third BDDs, each of the third BDDs representing a different one of a plurality of web pages, each of the web pages having a unique page ID, each of the third BDDs being constructed based on the page ID of the web page represented by the third BDD;

means for constructing a plurality of fourth BDDs, each of the fourth BDDs representing a different one of a plurality of search results generated in response to the search queries, each of the search results comprising one or more of the web pages, each fourth BDD being constructed by performing an OR operation on the third BDDs representing the web pages in the search result represented by the fourth BDD;

means for constructing a plurality of fifth BDDs, each of the fifth BDDs representing a different one of a plurality of search tuples, each of the search tuples comprising a different one of the search queries and a different one of the search results corresponding to the search query, each fifth BDD being constructed by performing an AND operation on the second BDD representing the search query and the fourth BDD representing the search result that the search tuple represented by the fifth BDD; and means for constructing a sixth BDD by performing an OR operation on the fifth BDDs, the sixth BDD representing the search queries and the search results.

65. A system comprising:

means for assigning a plurality of word identifiers (IDs), each of the word IDs being assigned to a different one of a plurality of words, each of the words appearing at least once in a plurality of search queries, each of the search queries comprising one or more of the words, wherein the plurality of search queries comprise a plurality of cached search queries that have been previously submitted to a search engine;

means for assigning a plurality of page IDs, each of the page IDs being assigned to a different one of a plurality of web pages, each of the web pages being included at least once in a plurality of search results generated in response to the search queries, each of the search results comprising one or more of the web pages;

means for obtaining a plurality of query IDs, each of the query IDs identifying a different one of the search queries, each of the query IDs being obtained by combining the word IDs identifying the words comprised in the search query identified by the query ID; and means for constructing a BDD representing the search queries and the search results, the BDD comprising:

a binary 0 terminal node;

a binary 1 terminal node; and a plurality of paths, each path comprising a plurality of decision nodes and leading to either the 0 terminal node or the 1 terminal node, each decision node represents a binary digit in one of the query IDs or one of the page IDs in binary format, and for each of the paths that leads to the 1 terminal node, a web page represented by first one or more of the decision nodes on the path is included in a search result for a search query represented by second one or more of the decision nodes on the path.

* * * * *